(12) United States Patent
Yuzawa et al.

(10) Patent No.: US 10,345,162 B2
(45) Date of Patent: Jul. 9, 2019

(54) SENSOR AND ELECTRONIC DEVICE

(71) Applicant: KABUSHIKI KAISHA TOSHIBA, Tokyo (JP)

(72) Inventors: Akiko Yuzawa, Kanagawa (JP); Hideaki Fukuzawa, Kanagawa (JP); Kei Masunishi, Kanagawa (JP); Yoshihiro Higashi, Ishikawa (JP); Michiko Hara, Kanagawa (JP); Yoshihiko Fuji, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 15/246,964

(22) Filed: Aug. 25, 2016

(65) Prior Publication Data

US 2017/0059424 A1 Mar. 2, 2017

(30) Foreign Application Priority Data

Aug. 28, 2015 (JP) .................................. 2015-168648
Mar. 17, 2016 (JP) .................................. 2016-054330

(51) Int. Cl.
*G01L 1/22* (2006.01)
(52) U.S. Cl.
CPC .......... *G01L 1/2206* (2013.01); *G01L 1/2287* (2013.01)
(58) Field of Classification Search
CPC .................... G01L 1/2206; G01L 1/2287
See application file for complete search history.

(56) References Cited

U.S. PATENT DOCUMENTS

| 7,490,522 B2* | 2/2009 | Ruehrig | G01L 1/12 73/862.335 |
| 8,531,088 B2 | 9/2013 | Grosh et al. | |
| 8,958,574 B2* | 2/2015 | Fukuzawa | G01L 9/0042 381/115 |
| 8,973,446 B2* | 3/2015 | Fukuzawa | G01L 1/12 73/779 |

(Continued)

FOREIGN PATENT DOCUMENTS

| JP | 2004-93140 | 3/2004 |
| JP | 2011-164057 | 8/2011 |

(Continued)

OTHER PUBLICATIONS

Fang et al.; "Determining Mean and Gradient Residual Stresses in Thin Films Using Micromachined Cantilevers", J. Micromech, Microeng. vol. 6, pp. 301-309, (1996).

*Primary Examiner* — Jamel E Williams
(74) *Attorney, Agent, or Firm* — Finnegan, Henderson, Farabow, Garrett & Dunner, L.L.P.

(57) ABSTRACT

According to one embodiment, a sensor includes a first sensor unit, a first stacked body, and a film unit. The first sensor unit includes a first magnetic layer, a second magnetic layer, and a first intermediate layer, the first intermediate layer being provided between the first magnetic layer and the second magnetic layer. The first stacked body includes a third magnetic layer, a fourth magnetic layer, and a second intermediate layer, the second intermediate layer being provided between the third magnetic layer and the fourth magnetic layer. The film unit is deformable. A portion of the film unit is disposed between the first sensor unit and the first stacked body.

19 Claims, 22 Drawing Sheets

(56) References Cited

U.S. PATENT DOCUMENTS

| | | | |
|---|---|---|---|
| 9,651,432 B2 * | 5/2017 | Fuji | G01L 9/007 |
| 2011/0204750 A1 * | 8/2011 | Fujii | H01L 41/094 |
| | | | 310/330 |
| 2012/0206014 A1 * | 8/2012 | Bibl | B06B 1/0644 |
| | | | 310/331 |
| 2013/0255393 A1 * | 10/2013 | Fukuzawa | G01L 1/12 |
| | | | 73/779 |
| 2014/0090486 A1 * | 4/2014 | Fuji | G01L 9/0044 |
| | | | 73/862.69 |
| 2014/0369530 A1 | 12/2014 | Fuji et al. | |
| 2015/0268116 A1 * | 9/2015 | Fuji | H01L 43/12 |
| | | | 438/3 |
| 2016/0320899 A1 * | 11/2016 | Watazu | G06F 3/047 |

FOREIGN PATENT DOCUMENTS

| | | | | |
|---|---|---|---|---|
| JP | 2011-176038 | | 9/2011 | |
| JP | 2013-205403 | | 10/2013 | |
| JP | 2014-74606 A | | 4/2014 | |
| JP | 2014-240824 | | 12/2014 | |
| JP | 2015137869 A | * | 7/2015 | G01L 1/2287 |
| WO | WO 2006002988 A1 | * | 1/2006 | G01L 1/12 |

\* cited by examiner

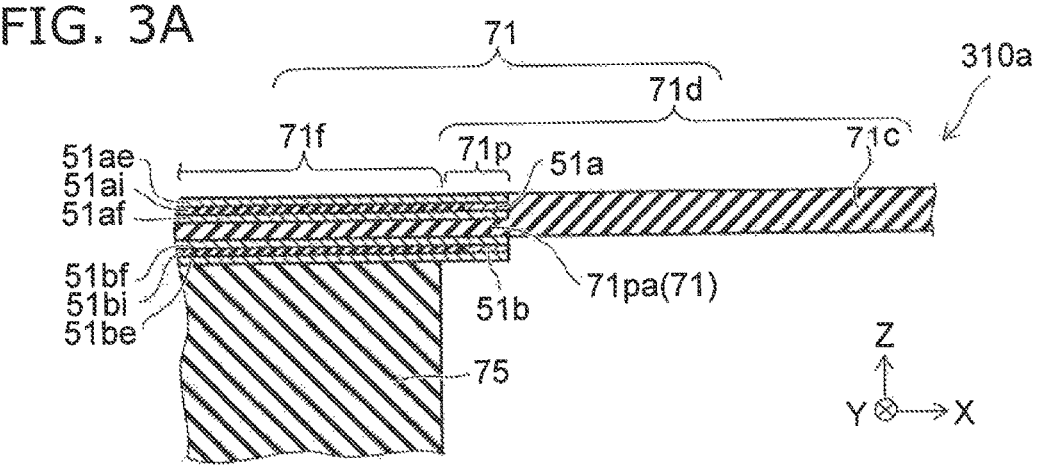
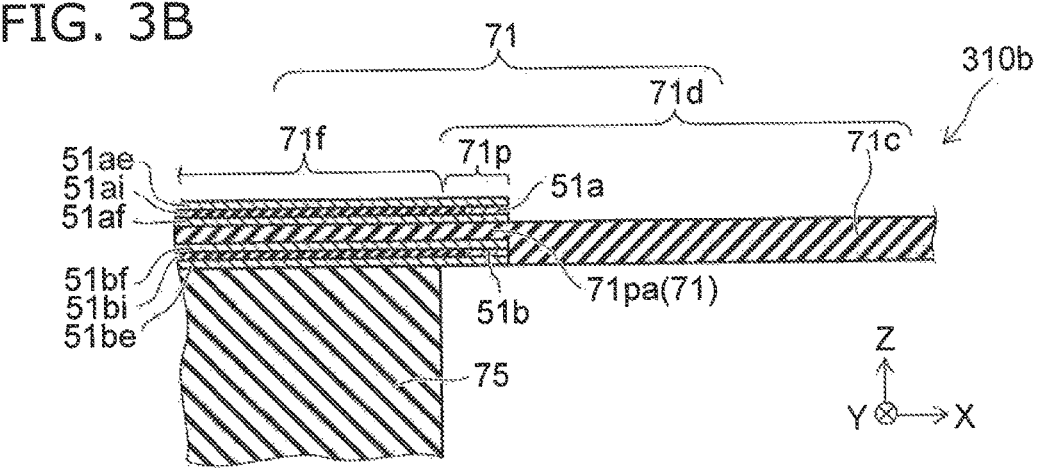
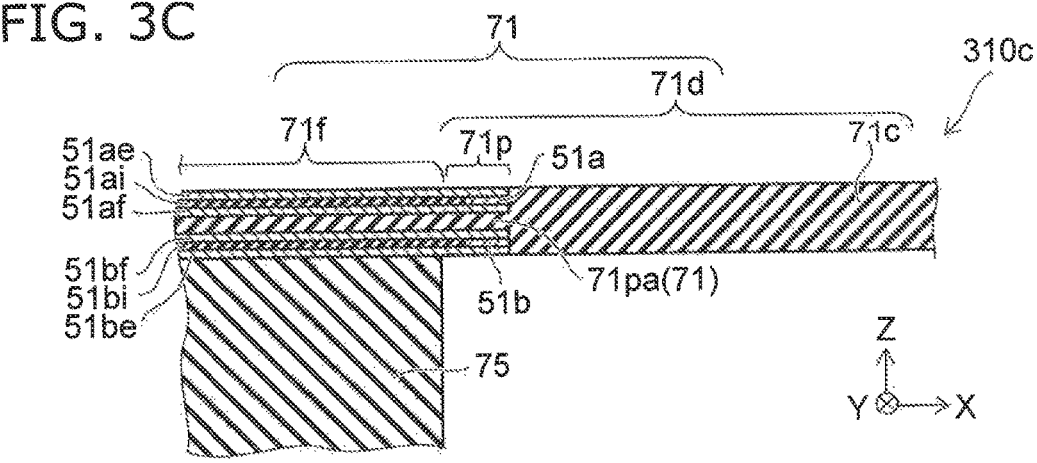

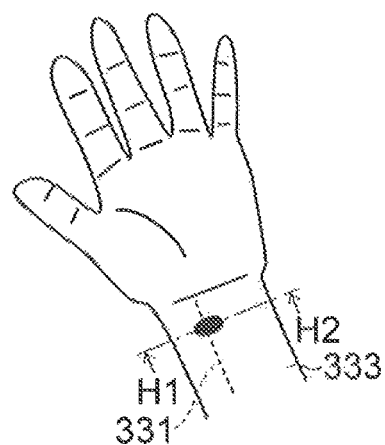
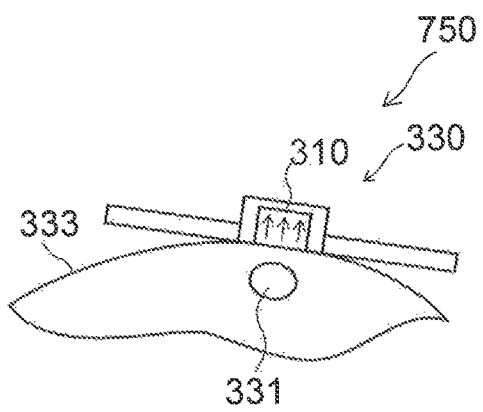
FIG. 23A    FIG. 23B
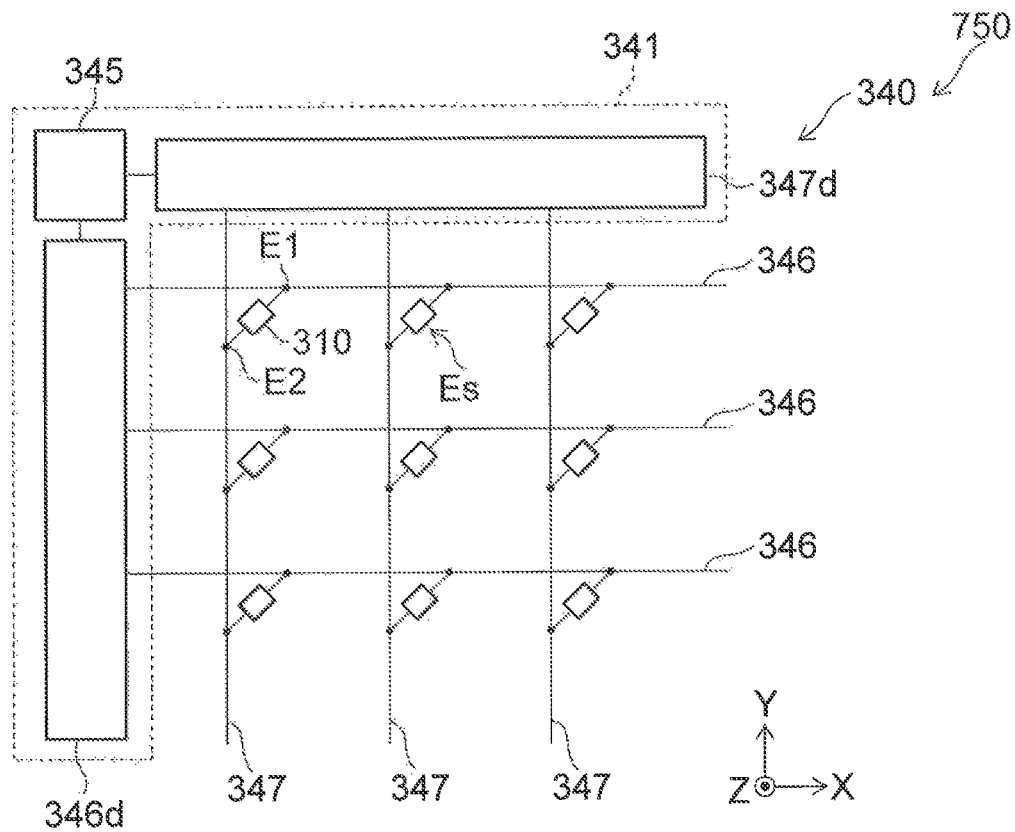
FIG. 24

US 10,345,162 B2

SENSOR AND ELECTRONIC DEVICE

CROSS-REFERENCE TO RELATED APPLICATIONS

This application is based upon and claims the benefit of priority from Japanese Patent Application No. 2015-168648, filed on Aug. 28, 2015 and Japanese Patent Application No. 2016-054330, filed on Mar. 17, 2016; the entire contents of which are incorporated herein by reference.

FIELD

Embodiments described herein relate generally to a sensor and an electronic device.

BACKGROUND

There is a sensor such as a pressure sensor or the like that converts pressure applied from the outside into an electrical signal. Higher sensitivity of the sensor is desirable.

BRIEF DESCRIPTION OF THE DRAWINGS

FIG. 3A to FIG. 3C are schematic cross-sectional views illustrating other pressure sensors according to the first embodiment;

FIG. 23A and FIG. 23B are schematic views illustrating another electronic device according to the third embodiment; and FIG. 24 is a schematic view illustrating another electronic device according to the third embodiment.

DETAILED DESCRIPTION

Figure 1A:
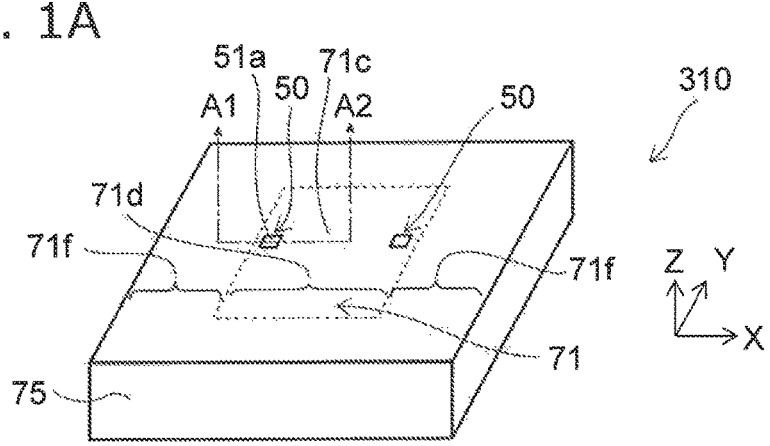
FIG. 1A to FIG. 1C are schematic views illustrating a pressure sensor according to a first embodiment.

According to one embodiment, a sensor includes a first sensor unit, a first stacked body, and a film unit. The first sensor unit includes a first magnetic layer, a second magnetic layer, and a first intermediate layer, the first intermediate layer being provided between the first magnetic layer and the second magnetic layer. The first stacked body includes a third magnetic layer, a fourth magnetic layer, and a second intermediate layer, the second intermediate layer being provided between the third magnetic layer and the fourth magnetic layer. The film unit is deformable. A portion of the film unit is disposed between the first sensor unit and the first stacked body.

According to one embodiment, a sensor includes a first sensor unit, a first layer, and a film unit. The first sensor unit includes a first magnetic layer, a second magnetic layer, and a first intermediate layer. The first intermediate layer is provided between the first magnetic layer and the second magnetic layer. The film unit is deformable. A portion of the film unit is disposed between the first sensor unit and the first stacked body. A material of the first layer is different from a material of the film unit.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
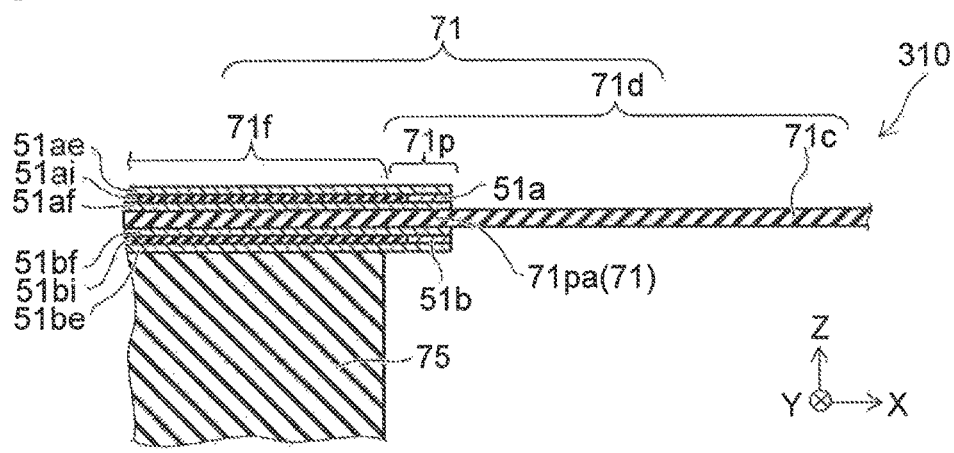
Figure 1C:
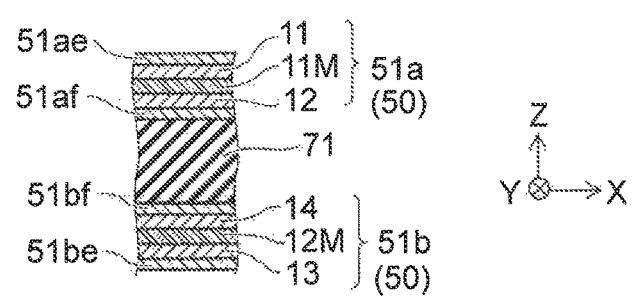

FIG. 1A to FIG. 1C are schematic views illustrating a pressure sensor according to a first embodiment.

FIG. 1A is a perspective view. FIG. 1B is a line A1-A2 cross-sectional view of FIG. 1A. FIG. 1C is a schematic cross-sectional view illustrating a portion of the pressure sensor.

As shown in FIG. 1A and FIG. 1B, the pressure sensor 310 (the sensor) according to the embodiment includes a first sensor unit 51a, a first stacked body 51b, a film unit 71, and a holder 75 (a supporter). The first stacked body 51b is not shown in FIG. 1A.

In the example, the first stacked body 51b functions as a sensor unit 50. In other words, the multiple sensor units 50 (the first sensor unit 51a, the first stacked body 51b, etc.) are provided in the pressure sensor 310.

The film unit 71 is deformable. A portion 71*pa* of the film unit 71 is provided between the first sensor unit 51*a* and the first stacked body 51*b*.

As shown in FIG. 1C, the first sensor unit 51*a* includes a first magnetic layer 11, a second magnetic layer 12, and a first intermediate layer 11M. The first intermediate layer 11M is provided between the first magnetic layer 11 and the second magnetic layer 12. In the example, the second magnetic layer 12 is provided between the first magnetic layer 11 and the portion 71*pa* of the film unit 71.

The first stacked body 51*b* includes a third magnetic layer 13, a fourth magnetic layer 14, and a second intermediate layer 12M. The second intermediate layer 12M is provided between the third magnetic layer 13 and the fourth magnetic layer 14. In the example, the fourth magnetic layer 14 is provided between the third magnetic layer 13 and the portion 71*pa* of the film unit 71.

A direction from the portion 71*pa* of the film unit 71 toward the first sensor unit 51*a* is taken as a Z-axis direction. One direction perpendicular to the Z-axis direction is taken as an X-axis direction. A direction perpendicular to the Z-axis direction and the X-axis direction is taken as a Y-axis direction.

At least a portion of the first stacked body 51*b* overlaps the first sensor unit 51*a* in the Z-axis direction.

For example, the direction from the second magnetic layer 12 toward the first magnetic layer 11 is aligned with the Z-axis direction. For example, the direction from the third magnetic layer 13 toward the fourth magnetic layer 14 is aligned with the Z-axis direction. For example, the direction from the third magnetic layer 13 toward the first magnetic layer 11 is aligned with the Z-axis direction.

In the pressure sensor 310, the film unit 71 deforms when pressure from the outside is applied to the film unit 71. The magnetization of at least one of the first magnetic layer 11 or the second magnetic layer 12 changes with the deformation. The change of the magnetization (the change of the magnetization direction) is based on inverse magnetostriction. The electrical resistance between the first magnetic layer 11 and the second magnetic layer 12 changes with the change of the magnetization direction. The pressure that is applied is sensed by sensing the change of the electrical resistance.

In the example, a first electrode layer 51*ae* and a second electrode layer 51*af* are provided in the first sensor unit 51*a*. The first magnetic layer 11 and the second magnetic layer 12 are disposed between the first electrode layer 51*ae* and the second electrode layer 51*af*. In the example, a first insulating layer 51*ai* is further provided. The first magnetic layer 11 and the second magnetic layer 12 are disposed between a portion of the first electrode layer 51*ae* and a portion of the second electrode layer 51*af*. The first magnetic layer 11 and the second magnetic layer 12 are disposed between one other portion of the first electrode layer 51*ae* and one other portion of the second electrode layer 51*af*. The electrical resistance between the first magnetic layer 11 and the second magnetic layer 12 can be sensed by causing a current to flow between these electrode layers. The pressure that is applied is sensed by sensing the change of the electrical resistance.

In the example, a third electrode layer 51*be* and a fourth electrode layer 51*bf* are provided in the first stacked body 51*b*. The third magnetic layer 13 and the fourth magnetic layer 14 are disposed between the third electrode layer 51*be* and the fourth electrode layer 51*bf*. A second insulating layer 51*bi* is further provided in the example. The third magnetic layer 13 and the fourth magnetic layer 14 are disposed between a portion of the third electrode layer 51*be* and a portion of the fourth electrode layer 51*bf*. The third magnetic layer 13 and the fourth magnetic layer 14 are disposed between one other portion of the third electrode layer 51*be* and one other portion of the fourth electrode layer 51*bf*. The electrical resistance between the third magnetic layer 13 and the fourth magnetic layer 14 can be sensed by causing a current to flow between these electrode layers. The pressure that is applied is sensed by sensing the change of the electrical resistance.

In the pressure sensor 310, the portion 71*pa* of the deformable film unit 71 is disposed between the first sensor unit 51*a* and the first stacked body 51*b*. In other words, one other portion of the film unit 71 is not disposed between the first sensor unit 51*a* and the first stacked body 51*b*.

For example, in a first reference example, the first sensor unit 51*a* is provided on the film unit 71; and the first stacked body 51*b* is not provided. In such a first reference example, for example, there are cases where the film unit 71 has stress in a state in which the pressure from the outside (the pressure to be sensed) is not applied to the film unit 71. For example, the stress is generated in the process of manufacturing the pressure sensor 310. For example, in the manufacturing process, multiple films of different materials are stacked; and heating is performed. Stress remains in the film unit 71 due to the stacking process and the heating. For example, the film unit 71 warps due to the residual stress. For example, the film unit 71 warps so that the central portion of the film unit 71 is positioned in the downward direction. For example, there are also cases where the film unit 71 warps in a state in which the pressure from the outside (the pressure to be sensed) is not applied. In such a case, the degree of the deformation of the film unit 71 with respect to the pressure from the outside is small. Therefore, in the first reference example, there are cases where the sensing sensitivity is insufficient.

It was found that the stress that remains in the film unit 71 is caused by the high vertical (front-and-back) asymmetry of the film unit 71. For example, in the first reference example, the holder 75 (the supporter) is under the portion of the film unit 71 held (supported) by the holder 75 (the supporter). The sensor unit 50 (e.g., the first sensor unit 51*a*) is on this portion. For example, the materials of the holder 75 and the sensor unit 50 are different from each other. The asymmetry in the vertical direction of the film unit 71 is large. Therefore, the stress in a direction intersecting the Z-axis direction is different between the upper portion of the film unit 71 and the lower portion of the film unit 71. The film unit 71 warps due to the difference of the stress.

The stress that remains in the film unit 71 can be reduced by causing the configurations of the structure bodies provided on and under the film unit 71 to be closer to symmetrical. For example, it is effective for the materials of the structure bodies provided on and under the film unit 71 to be more similar to each other.

In the embodiment, the portion 71*pa* of the deformable film unit 71 is disposed between the first sensor unit 51*a* and the first stacked body 51*b*. In other words, for example, the materials and structures are similar between the structure body provided on the film unit 71 (in the example, the first sensor unit 51*a*) and the structure body provided under the film unit 71 (in the example, the first stacked body 51*b*). Thereby, the symmetry of the stress remaining in the film unit 71 can be high.

For example, a first difference (e.g., the absolute value) between the flexibility (a first value) of a layer (e.g., a magnetic layer) included in the first sensor unit 51*a* and the flexibility (a second value) of a layer (e.g., a magnetic layer)

included in the first stacked body 51b is less than a second difference (e.g., the absolute value) between the first value and the flexibility (a third value) of the holder 75. For example, the first difference (e.g., the absolute value) between the elastic modulus (the first value) of the layer (e.g., the magnetic layer) included in the first sensor unit 51a and the elastic modulus (the second value) of the layer (e.g., the magnetic layer) included in the first stacked body 51b is less than the second difference (e.g., the absolute value) between the first value and the elastic modulus (the third value) of the holder 75.

For example, the first difference (e.g., the absolute value) between the flexibility (the first value) of the layer (e.g., the electrode layer) included in the first sensor unit 51a and the flexibility (the second value) of the layer (e.g., the electrode layer) included in the first stacked body 51b is less than the second difference (e.g., the absolute value) between the first value and the flexibility (the third value) of the holder 75. For example, the first difference (e.g., the absolute value) between the elastic modulus (the first value) of the layer (e.g., the electrode layer) included in the first sensor unit 51a and the elastic modulus (the second value) of the layer (e.g., the electrode layer) included in the first stacked body 51b is less than the second difference (e.g., the absolute value) between the first value and the elastic modulus (the third value) of the holder 75.

Thus, in the embodiment, the stress that remains in the film unit 71 is suppressed by disposing similar structure bodies on and under the film unit 71. Thereby, the sensitivity can be increased. The sensing precision can be increased. According to the embodiment, a pressure sensor in which the sensitivity can be increased can be provided.

In the embodiment, the film unit 71 deforms when pressure from the outside is applied to the film unit 71. The degree of the deformation of the film unit 71 is large in the peripheral region of the film unit 71. Thus, the sensitivity of the sensation of the pressure can be increased by disposing the sensor unit 50 in the region where the degree of the deformation is large.

In the embodiment, a magnetic layer is used as the sensor unit 50. For example, the pressure is sensed by the change of the magnetization based on the inverse magnetostriction. On the other hand, there is a second reference example in which a piezoelectric effect element or a silicon element is used as the sensor element. In the embodiment, the sensor unit 50 includes a magnetic layer. Therefore, higher sensitivity is obtained by providing the sensor units 50 on and under the film unit 71. For example, the sign (the polarity) of the strain applied to the sensor units 50 is reversed vertically by providing the sensor units 50 on and under the film unit 71. Thereby, a differential voltage can be acquired from the elements on and under the film unit 71. Highly-sensitive sensing can be performed by using the differential voltage.

As shown in FIG. 1A and FIG. 1B, the film unit 71 includes a fixed region 71f and a deformation region 71d. The fixed region 71f is fixed to the holder 75. The deformation region 71d deforms. The deformation region 71d includes a center 71c and a peripheral region 71p. The center 71c is the center of the deformation region 71d. The peripheral region 71p is provided around the center 71c. The portion 71pa of the film unit 71 recited above (the portion provided between the first sensor unit 51a and the first stacked body 51b) is positioned in the peripheral region 71p.

The peripheral region 71p is proximal to the fixed region 71f. The peripheral region 71p is distal to the center 71c. The distance between the peripheral region 71p and the fixed region 71f is shorter than the distance between the peripheral region 71p and the center 71c.

High sensitivity is obtained by disposing the sensor unit 50 (the first sensor unit 51a, the first stacked body 51b, etc.) in the peripheral region 71p proximal to the fixed region 71f.

In the embodiment, a portion of the electrode layer provided in the sensor unit 50 overlaps the fixed region 71f of the film unit 71. In other words, the pressure sensor 310 includes the first electrode layer 51ae and the second electrode layer 51af. The first magnetic layer 11 and the second magnetic layer 12 are disposed between a portion of the first electrode layer 51ae and a portion of the second electrode layer 51af. On the other hand, the film unit 71 includes the fixed region 71f that is fixed to the holder 75, and the deformation region 71d that deforms.

For example, a portion of the first electrode layer 51ae overlaps the fixed region 71f in the Z-axis direction. For example, a portion of the second electrode layer 51af overlaps the fixed region 71f in the Z-axis direction. In other words, a portion of at least one of the first electrode layer 51ae or the second electrode layer 51af overlaps the holder 75 in the Z-axis direction (the second direction).

The direction from the fixed region 71f toward the deformation region 71d is taken as a first direction. A direction intersecting the first direction is taken as a second direction. The Z-axis direction corresponds to the second direction. For example, the first direction may correspond to the X-axis direction.

Thus, a portion of the electrode layer provided in the first sensor unit 51a overlaps the fixed region 71f of the film unit 71 in the Z-axis direction (the second direction).

Similarly, a portion of the electrode layer provided in the first stacked body 51b may overlap the fixed region 71f of the film unit 71. In other words, the pressure sensor 310 includes the third electrode layer 51be and the fourth electrode layer 51bf. The third magnetic layer 13 and the fourth magnetic layer 14 are disposed between a portion of the third electrode layer 51be and a portion of the fourth electrode layer 51bf. The film unit 71 includes the fixed region 71f that is fixed to the holder 75, and the deformation region 71d that deforms. A portion of the third electrode layer 51be overlaps the fixed region 71f in the Z-axis direction. A portion of the fourth electrode layer 51bf overlaps the fixed region 71f in the Z-axis direction. In other words, a portion of at least one of the third electrode layer 51be or the fourth electrode layer 51bf overlaps the holder 75 in the Z-axis direction (the second direction).

In the example, a portion of at least one of the third electrode layer 51be or the fourth electrode layer 51bf is disposed between the holder 75 and the film unit 71 (the fixed region 71f). In other words, a portion of the at least one of the third electrode layer 51be or the fourth electrode layer 51bf recited above is provided on the holder 75; and the fixed region 71f of the film unit 71 is provided on the portion. Then, the portion of the at least one of the first electrode layer 51ae or the second electrode layer 51af recited above is provided on the fixed region 71f. The fixed region 71f of the film unit 71 is fixed to the holder 75 via the electrode layer of the first stacked body 51b.

In the embodiment, spintronic strain sensor elements (the sensor units 50) are disposed on and under the diaphragm (the film unit 71). The optimal range of the strain of the spintronic strain sensor elements can be used. Thereby, high sensitivity is obtained.

Figure 2A:
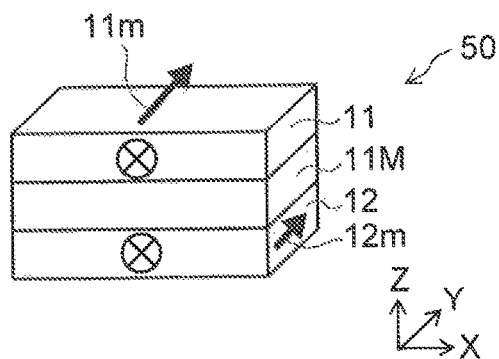
FIG. 2A to FIG. 2C are schematic perspective views illustrating operations of the pressure sensor according to the first embodiment.
Figure 2B:
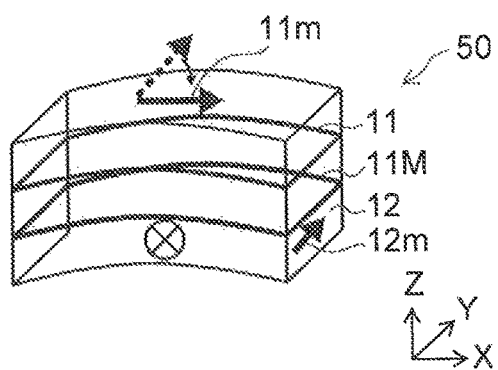
Figure 2C:
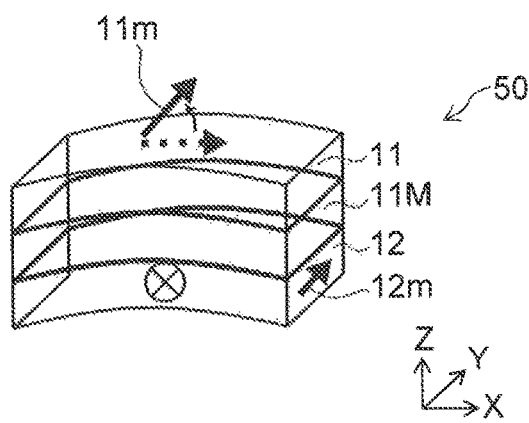

FIG. 2A to FIG. 2C are schematic perspective views illustrating operations of the pressure sensor according to the first embodiment.

These drawings illustrate different states of the sensor unit 50. The film unit 71 deforms due to the stress applied from the outside (the stress to be sensed). The stress is applied to the magnetic layers due to the deformation of the film unit 71. These drawings illustrate the relationship between the stress applied to the magnetic layers and the magnetization directions of the magnetic layers of the sensor unit 50. In the example, the first sensor unit 51a is illustrated as the sensor unit 50.

In the following example, the second magnetic layer 12 is a reference layer; and the first magnetic layer 11 is a free magnetic layer (a free layer).

FIG. 2A shows a state in which stress (in the example, tensile stress) is not applied. At this time, in the example, the orientation of a magnetization 12m of the second magnetic layer 12 (the reference layer) is the same as the orientation of a magnetization 11m of the first magnetic layer 11 (the free layer).

FIG. 2B shows a state in which stress (in the example, tensile stress) is applied. In the example, tensile stress is applied along the X-axis direction. For example, tensile stress is applied along the X-axis direction due to the deformation of the film unit 71. The tensile stress is aligned with a direction orthogonal to the orientations of the magnetizations of the second magnetic layer 12 and the first magnetic layer 11 (in the example, the Y-axis direction). At this time, the magnetization 11m of the first magnetic layer 11 rotates to be aligned with the direction of the tensile stress. The rotation is based on the inverse magnetostrictive effect. On the other hand, the magnetization 12m of the second magnetic layer 12 is substantially fixed. The angle between the magnetization 12m (the orientation) of the second magnetic layer 12 and the magnetization 11m (the orientation) of the first magnetic layer 11 changes due to the rotation of the magnetization 11m of the first magnetic layer 11.

In the inverse magnetostrictive effect, the easy magnetization axis changes due to the sign of the magnetostriction constant of the ferromagnet. Many materials that have a large inverse magnetostrictive effect have positive magnetostriction constants. In the case where the magnetostriction constant is positive, as described above, the direction in which the tensile stress is applied is the easy magnetization axis. On the other hand, in the case where the magnetostriction constant is negative, a direction perpendicular to the direction in which the tensile stress is applied is the easy magnetization axis. In such a case, due to the stress application, the magnetization 11m of the first magnetic layer 11 becomes aligned with a direction perpendicular to the direction in which the stress is applied.

For example, in the case where the magnetostriction constant of the first magnetic layer 11 is positive, the initial magnetization direction of the first magnetic layer 11 (the magnetization direction when the stress is not applied) is set to a direction that is different from the direction in which the tensile stress is applied.

FIG. 2C illustrates a state in the case where the magnetostriction constant is negative. In such a case, the initial magnetization direction of the first magnetic layer 11 (the magnetization direction when the stress is not applied) is set to a direction that is different from the direction perpendicular to the direction in which the tensile stress is applied (in the example, the X-axis direction).

In the pressure sensor 310, the electrical resistance between the first magnetic layer 11 and the second magnetic layer 12 changes according to the angle between the magnetization 11m of the first magnetic layer 11 and the magnetization 12m of the second magnetic layer 12. For example, the change is based on the MR effect.

In the embodiment, the first magnetic layer 11 may be a reference layer (the fixed magnetic layer); and the second magnetic layer 12 may be a free magnetic layer. The first magnetic layer 11 may be a free magnetic layer; and the second magnetic layer 12 also may be a free magnetic layer.

Thus, in the embodiment, the electrical resistance between the first magnetic layer 11 and the second magnetic layer 12 changes according to the deformation of the film unit 71. In other words, for example, at least one of the magnetization 11m (a first magnetization) of the first magnetic layer 11 or the magnetization 12m (a second magnetization) of the second magnetic layer 12 changes according to the deformation of the film unit 71. Thereby, the electrical resistance between the first magnetic layer 11 and the second magnetic layer 12 changes according to the deformation of the film unit 71. At least one of the magnetization of the third magnetic layer 13 or the magnetization of the fourth magnetic layer 14 changes according to the deformation of the film unit 71. Thereby, the electrical resistance between the third magnetic layer 13 and the fourth magnetic layer 14 changes according to the deformation of the film unit 71.

The description relating to the first sensor unit 51a recited above is applicable to the first stacked body 51b. For example, the third magnetic layer 13 corresponds to one of the first magnetic layer 11 or the second magnetic layer 12. The fourth magnetic layer 14 corresponds to the other one of the first magnetic layer 11 or the second magnetic layer 12.

For example, in the case where the sensing is performed by the first stacked body 51b, the electrical resistance of the first stacked body 51b is sensed. In other words, the electrical resistance between the third magnetic layer 13 and the fourth magnetic layer 14 changes according to the deformation of the film unit 71.

For example, in the case where the second magnetic layer 12 is a fixed magnetic layer, the second magnetic layer 12 includes at least one of Fe, Co, or Ni. An alloy that includes two or more of Fe, Co, or Ni may be used. In addition to the materials recited above, the second magnetic layer 12 may further include other elements (added elements). The second magnetic layer 12 includes, for example, at least one of a CoFe alloy, a CoFeB alloy, a NiFe alloy, etc. The thickness of the second magnetic layer 12 is, for example, not less than 2 nanometers (nm) and not more than 6 nm.

The first intermediate layer 11M includes a metal or an insulator. The first intermediate layer 11M includes, for example, at least one of Cu, Au, or Ag. In the case where a metal is used as the first intermediate layer 11M, the thickness of the first intermediate layer 11M is, for example, not less than 1 nm and not more than 7 nm. On the other hand, the first intermediate layer 11M includes, for example, magnesium oxide (MgO, etc.), aluminum oxide ($Al_2O_3$, etc.), titanium oxide (TiO, etc.), or zinc oxide (ZnO, etc.). In the case where an insulator is used as the first intermediate layer 11M, the thickness of the first intermediate layer 11M is, for example, not less than 1 nm and not more than 3 nm.

In the case where the first magnetic layer 11 is a free magnetic layer, the first magnetic layer 11 includes, for example, at least one of Fe, Co, or Ni. The first magnetic layer 11 may include an alloy material including two or more of Fe, Co, or Ni. In addition to the materials recited above, the first magnetic layer 11 may further include other elements (added elements).

The first magnetic layer 11 includes, for example, a material having a large magnetostriction (magnetostriction constant). Specifically, a material of which the absolute value of the magnetostriction is greater than $10^{-5}$ is used. Thereby, the sensitivity of the change of the magnetization with respect to the strain (the stress) can be high. The first magnetic layer 11 includes a material having a positive magnetostriction or a material having a negative magnetostriction.

The first magnetic layer 11 includes, for example, a single-element metal of Fe, Co, or Ni. Or, the first magnetic layer 11 includes, for example, an alloy including at least one of Fe, Co, or Ni. The first magnetic layer 11 includes, for example, an Fe—Co—Si—B alloy. The first magnetic layer 11 includes, for example, a Tb-M-Fe alloy (M being Sm, Eu, Gd, Dy, Ho, or Er). The first magnetic layer 11 includes, for example, a Tb-M1-Fe-M2 alloy (M1 being Sm, Eu, Gd, Dy, Ho, or Er, and M2 being Ti, Cr, Mn, Co, Cu, Nb, Mo, W, or Ta). The first magnetic layer 11 includes, for example, an Fe-M3-M4-B alloy (M3 being Ti, Cr, Mn, Co, Cu, Nb, Mo, W, or Ta, and M4 being Ce, Pr, Nd, Sm, Tb, Dy, or Er). The first magnetic layer 11 includes, for example, Ni. The first magnetic layer 11 may include, for example, Al—Fe. The first magnetic layer 11 may include, for example, ferrite ($Fe_3O_4$, $(FeCo)_3O_4$), or the like), etc. A magnetostriction constant λs is greater than 100 ppm for the Tb-M-Fe alloy and the Fe-M3-M4-B alloy recited above. The thickness of the first magnetic layer 11 is, for example, 2 nm or more.

The first magnetic layer 11 may have a stacked structure (a structure including multiple films). For example, the first magnetic layer 11 may include a layer of an FeCo alloy, and a layer stacked with the layer of the FeCo alloy. The layer that is stacked includes, for example, an Fe—Co—Si—B alloy. The layer that is stacked includes, for example, a Tb-M-Fe alloy (M being Sm, Eu, Gd, Dy, Ho, or Er). The layer that is stacked includes, for example, a Tb-M1-Fe-M2 alloy (M1 being Sm, Eu, Gd, Dy, Ho, or Er, and M2 being Ti, Cr, Mn, Co, Cu, Nb, Mo, W, or Ta). The layer that is stacked includes, for example, an Fe-M3-M4-B alloy (M3 being Ti, Cr, Mn, Co, Cu, Nb, Mo, W, or Ta, and M4 being Ce, Pr, Nd, Sm, Tb, Dy, or Er). The layer that is stacked includes, for example, Ni. The layer that is stacked includes, for example, Al—Fe. The layer that is stacked may include, for example, ferrite ($Fe_3O_4$, $(FeCo)_3O_4$), or the like), etc. The magnetostriction constant λs is greater than 100 ppm for the Tb-M-Fe alloy and the Fe-M3-M4-B alloy recited above.

A high strain sensitivity GF (Gauge Factor) is obtained when the magnetostriction constant of the first magnetic layer 11 is large. The GF value is affected not only by the magnetostriction constant but also by the soft magnetic property of the first magnetic layer 11. The strain sensitivity GF is expressed by GF=(ΔR/R)/Δε. Here, Δε is the strain. R is the resistance. ΔR is the change of the resistance when subjected to the strain of Δε. The strain sensitivity GF is the magnitude of the resistance change amount for the unit strain change and is a dimensionless quantity.

For example, an alloy (a material) that has an amorphous structure and includes Fe has a large GF. For example, a GF value of 3,000 or more is obtained for this material.

In this specification, an amorphous structure may include a microcrystal structure. In such a microcrystal structure, the size of the crystal grain is less than 2 nm. The amorphous structure has a structure in which a crystal structure is not confirmed. For example, the microcrystal structure or the structure in which the crystal structure is not confirmed can be observed using a transmission electron microscope image. For example, the observation may be performed using electron diffraction of the magnetic layer by a microbeam. For example, it can be determined from whether the electron diffraction pattern is a spot pattern or a ring pattern. For example, a spot pattern corresponds to a crystal structure. A ring pattern corresponds to an amorphous structure.

For example, the magnetic layer easily becomes amorphous by including an alloy including B and Fe in the magnetic layers (e.g., the first magnetic layer 11, the third magnetic layer 13, etc.) included in the sensor unit 50.

In the embodiment, the electrode layers include, for example, at least one of Ta, TaMo, Cu, CuAg, Ru, Au, NiFe, or FeSi.

In the embodiment, the holder 75 includes, for example, at least one of Si, $SiO_x$, or $AlO_x$. The film unit 71 includes, for example, at least one of Si, $SiO_x$, $AlO_x$, or $SiN_x$. At least a portion of the film unit 71 may include a material included in at least a portion of the holder 75. A portion of the film unit 71 may be continuous with the holder 75.

The thickness of the film unit 71 (the length along the Z-axis direction) is, for example, not less than 0.1 micrometers (μm) and not more than 10 μm. The thickness of the holder 75 is, for example, not less than 200 μm and not more than 600 μm. The thickness of the film unit 71 is not less than 0.00001 times and not more than 0.05 times the thickness of the holder 75.

FIG. 3A to FIG. 3C are schematic cross-sectional views illustrating other pressure sensors according to the first embodiment.

In a pressure sensor 310a according to the embodiment as shown in FIG. 3A, the lower surface of the deformation region 71d of the film unit 71 is positioned higher than the lower surface of the first stacked body 51b. The lower surface of the deformation region 71d of the film unit 71 is positioned higher than the lower surface of the fourth electrode layer 51bf. The position in the Z-axis direction of the upper surface of the deformation region 71d of the film unit 71 substantially matches the position in the Z-axis direction of the upper surface of the first electrode layer 51ae.

In a pressure sensor 310b according to the embodiment as shown in FIG. 3B, the upper surface of the deformation region 71d of the film unit 71 is positioned lower than the upper surface of the first sensor unit 51a. The upper surface of the deformation region 71d of the film unit 71 is positioned lower than the upper surface of the second electrode layer 51af. The position in the Z-axis direction of the upper surface of the deformation region 71d of the film unit 71 substantially matches the position in the Z-axis direction of the lower surface of the third electrode layer 51be.

In a pressure sensor 310c according to the embodiment as shown in FIG. 3C, the position in the Z-axis direction of the upper surface of the deformation region 71d of the film unit 71 substantially matches the position in the Z-axis direction of the upper surface of the first electrode layer 51ae. The position in the Z-axis direction of the lower surface of the deformation region 71d of the film unit 71 substantially matches the position in the Z-axis direction of the lower surface of the third electrode layer 51be.

Thus, various modifications are possible for the relationship between the positions in the Z-axis direction of the upper surface and lower surface of the film unit 71 and the positions in the Z-axis direction of the electrode layers. Various modifications are possible for the relationship between the positions in the Z-axis direction of the upper surface and lower surface of the film unit 71 and the position in the Z-axis direction of the magnetic layer.

Figure 4A:
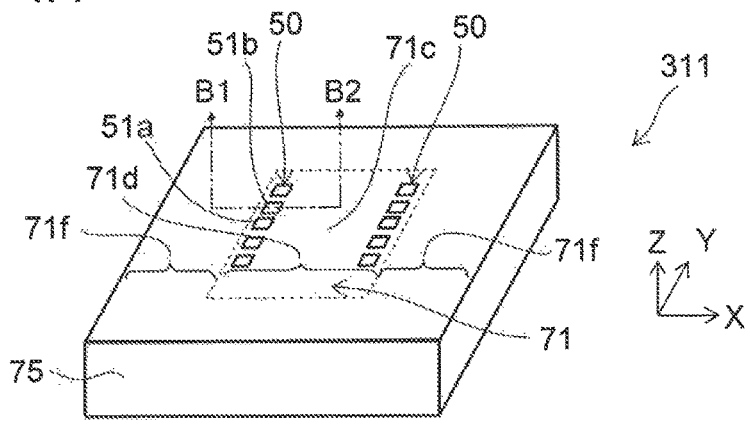
FIG. 4A to FIG. 4C are schematic views illustrating another pressure sensor according to the first embodiment.
Figure 4B:
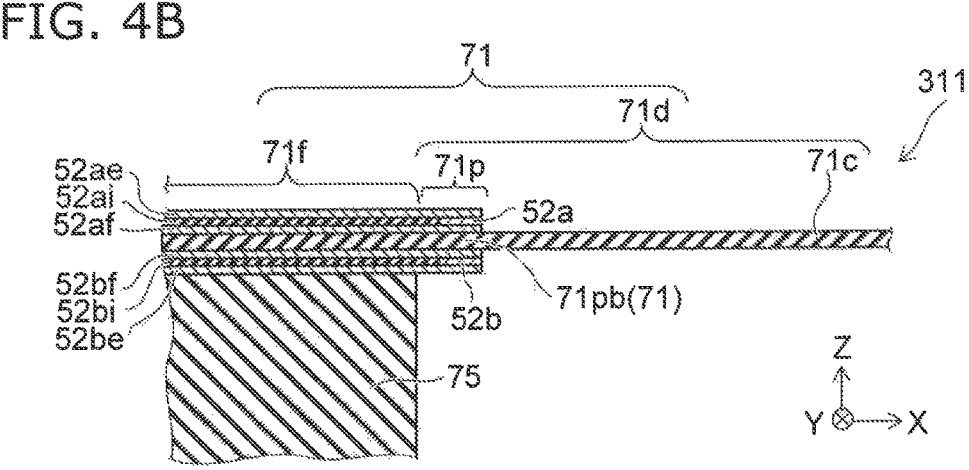
Figure 4C:
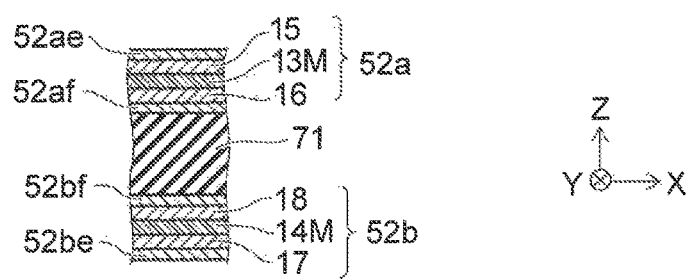

FIG. 4A to FIG. 4C are schematic views illustrating another pressure sensor according to the first embodiment.

FIG. 4A is a perspective view. FIG. 4B is a line B1-B2 cross-sectional view of FIG. 1A. FIG. 4C is a schematic cross-sectional view illustrating a portion of the pressure sensor.

In the pressure sensor 311 according to the embodiment as shown in FIG. 4A, multiple sensor units 50 are provided on the film unit 71. For example, the multiple sensor units 50 (the first sensor unit 51a, a second sensor unit 52a, etc.) are provided along the Y-axis direction. The multiple sensor units 50 are arranged along the outer edge of the film unit 71 (the boundary between the film unit 71 and the holder 75).

A second stacked body 52b is provided as shown in FIG. 4B. The second stacked body 52b is not shown in FIG. 4A. The first sensor unit 51a and the first stacked body 51b are similar to those described in reference to the pressure sensor 310. The second sensor unit 52a and the second stacked body 52b will now be described.

As shown in FIG. 4B, the pressure sensor 311 includes the second sensor unit 52a and the second stacked body 52b. A portion 71pb of the film unit 71 (a portion other than the portion 71pa) is disposed between the second sensor unit 52a and the second stacked body 52b.

As shown in FIG. 4C, the second sensor unit 52a includes a fifth magnetic layer 15, a sixth magnetic layer 16, and a third intermediate layer 13M. The third intermediate layer 13M is provided between the fifth magnetic layer 15 and the sixth magnetic layer 16. For example, the fifth magnetic layer 15 corresponds to the first magnetic layer 11. For example, the sixth magnetic layer 16 corresponds to the second magnetic layer 12. For example, the third intermediate layer 13M corresponds to the first intermediate layer 11M.

The second stacked body 52b includes a seventh magnetic layer 17, an eighth magnetic layer 18, and a fourth intermediate layer 14M. The fourth intermediate layer 14M is provided between the seventh magnetic layer 17 and the eighth magnetic layer 18. For example, the seventh magnetic layer 17 corresponds to the third magnetic layer 13. For example, the eighth magnetic layer 18 corresponds to the fourth magnetic layer 14. For example, the fourth intermediate layer 14M corresponds to the second intermediate layer 12M.

For example, at least one of the magnetization of the fifth magnetic layer 15 or the magnetization of the sixth magnetic layer 16 changes according to the deformation of the film unit 71. Thereby, the electrical resistance between the fifth magnetic layer 15 and the sixth magnetic layer 16 changes according to the deformation of the film unit 71. At least one of the magnetization of the seventh magnetic layer 17 or the magnetization of the eighth magnetic layer 18 changes according to the deformation of the film unit 71. Thereby, the electrical resistance between the seventh magnetic layer 17 and the eighth magnetic layer 18 changes according to the deformation of the film unit 71.

The multiple sensor units 50 may be connected directly to each other. The multiple sensor units 50 may be connected in parallel with each other.

For example, the second sensor unit 52a may be connected electrically in series with the first sensor unit 51a. The second stacked body 52b may be connected electrically in series with the first stacked body 51b. The first stacked body 51b may be connected electrically in series with the first sensor unit 51a. The second stacked body 52b may be connected electrically in series with the first stacked body 51b. By providing the multiple sensor units 50, for example, the sensing sensitivity improves. The noise can be reduced.

Figures 5A, 5B:
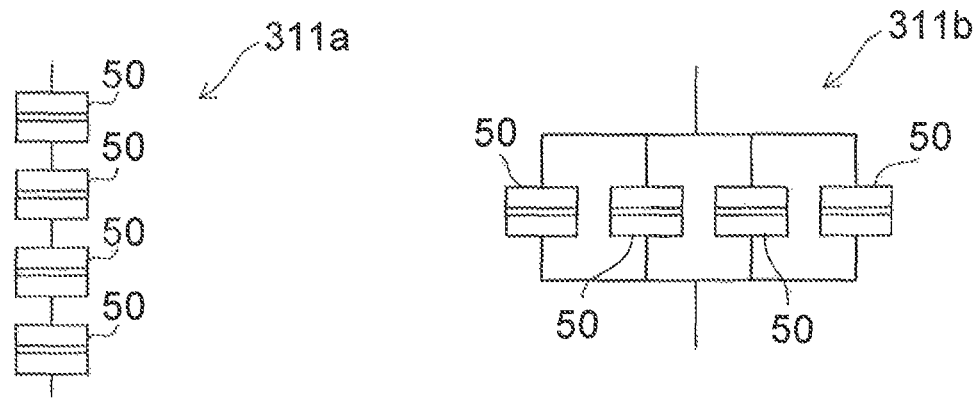
FIG. 5A to FIG. 5C are schematic views illustrating pressure sensors according to the first embodiment.
Figure 5C:
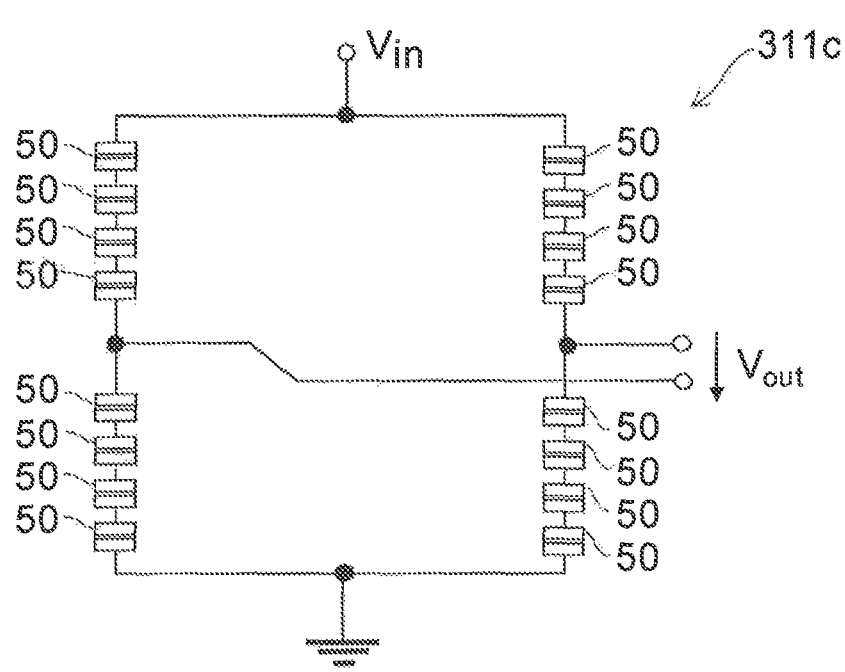

FIG. 5A to FIG. 5C are schematic views illustrating pressure sensors according to the first embodiment.

These drawings show examples of the connection state of the connections of the multiple sensor units 50.

In a pressure sensor 311a according to the embodiment as shown in FIG. 5A, the multiple sensor units 50 are connected electrically in series.

The electrical signal that is obtained when the number of sensor units 50 connected in series is N is N times that of the case where the number of sensor units 50 is 1. On the other hand, the thermal noise and the Schottky noise are $N^{1/2}$ times. In other words, the SN ratio (the signal-noise ratio (SNR)) is $N^{1/2}$ times. By increasing the number N of sensor units 50 connected in series, the SN ratio can be improved without increasing the size of the film unit 71.

The signals of the multiple sensor units 50 may be added. The bias voltage that is applied to one sensor unit 50 is, for example, not less than 50 millivolts (mv) and not more than 150 mV. In the case where N sensor units 50 are connected in series, the bias voltage is not less than 50 mV×N and not more than 150 mV×N. For example, in the case where the number N of sensor units 50 connected in series is 25, the bias voltage is not less than 1 V and not more than 3.75 V.

If the value of the bias voltage is not less than 1 V, the design of the electronic circuit that processes the electrical signals obtained from the sensor units 50 is easy; and this is practically favorable. For example, the multiple sensor units 50 that are provided obtain electrical signals having the same polarity when the pressure is applied. By connecting these sensing elements in series, the SN ratio can be improved as recited above.

In a pressure sensor 311b according to the embodiment as shown in FIG. 5B, the multiple sensor units 50 are electrically connected in parallel. In the embodiment, at least a portion of the multiple sensor units 50 may be electrically connected in parallel.

In a pressure sensor 311c according to the embodiment as shown in FIG. 5C, a Wheatstone bridge circuit is formed from the multiple sensor units 50. For example, temperature compensation of the sensing characteristics can be performed.

Second Embodiment

Figure 6A:
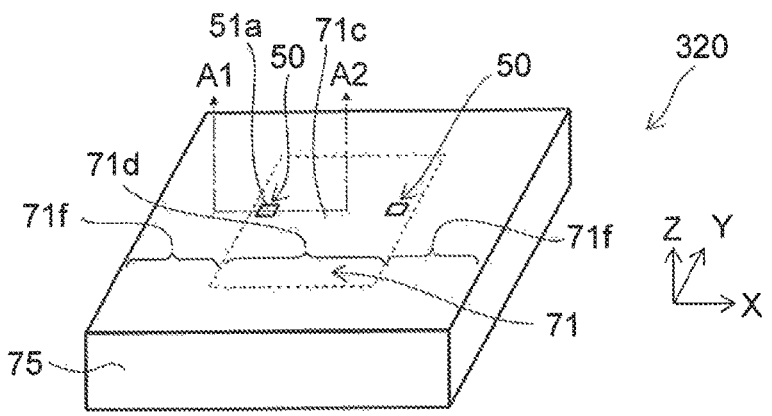
FIG. 6A to FIG. 6C are schematic views illustrating a pressure sensor according to a second embodiment.
Figure 6B:
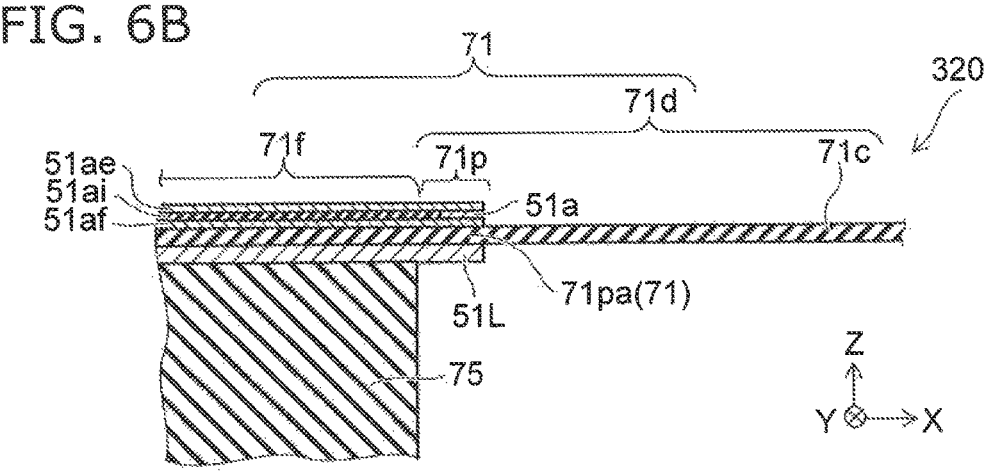
Figure 6C:
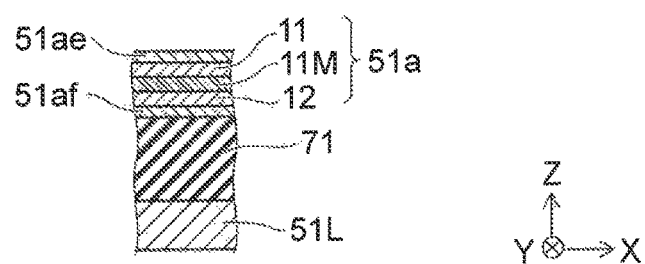

FIG. 6A to FIG. 6C are schematic views illustrating a pressure sensor according to a second embodiment.

FIG. 6A is a perspective view. FIG. 6B is a line A1-A2 cross-sectional view of FIG. 6A. FIG. 6C is a schematic cross-sectional view illustrating a portion of the pressure sensor.

As shown in FIG. 6A and FIG. 6B, the pressure sensor 320 according to the embodiment includes the first sensor unit 51a, a first layer 51L, the film unit 71, and the holder 75. The first layer 51L is not shown in FIG. 6A.

In such a case as well, as shown in FIG. 6C, the first sensor unit 51a includes the first magnetic layer 11, the second magnetic layer 12, and the first intermediate layer 11M. The first intermediate layer 11M is provided between the first magnetic layer 11 and the second magnetic layer 12.

In the example as well, the film unit 71 is deformable. The portion 71pa of the film unit 71 is disposed between the first sensor unit 51a and the first layer 51L. The holder 75 holds a portion of the film unit 71 (e.g., the portion 71pa).

The first layer 51L is provided at the portion 71pa of the film unit 71 but is not provided at the other portion of the deformation region 71d of the film unit 71. In other words, in the direction (the Z-axis direction) from the portion 71pa of the film unit 71 toward the first sensor unit 51a, one other portion of the film unit 71 (a portion of the deformation region 71d of the film unit 71) does not overlap the first layer 51L. In the Z-axis direction, the portion 71pa of the film unit 71 overlaps the first layer 51L.

The material of the first layer 51L is different from the material of the film unit 71. In the embodiment, the first layer 51L adjusts the stress generated in the film unit 71. By providing the first layer 51L, the stress that remains in the film unit 71 can be reduced. The first layer 51L is, for example, a pressure adjusting layer.

For example, the physical property values of the first layer 51L are different from the physical property values of the film unit 71. For example, the residual stress of the first layer 51l is different from the residual stress of the film unit 71.

The first layer 51L includes, for example, at least one of SiN, $SiO_x$, or $AlO_x$. The first layer 51L may include, for example, the material included in the electrode layers (e.g., the first electrode layer 51ae, the second electrode layer 51af, etc.). The film unit 71 includes at least one of SiN, $SiO_x$, or $AlO_x$. The film unit 71 may include, for example, the material included in the electrode layers (e.g., the first electrode layer 51ae, the second electrode layer 51af, etc.).

For example, in a $SiN_x$ film formed by plasma-excited CVD, stress control is possible by applying RF power of different frequencies. For example, for a $SiN_x$ film made using $SiH_4$ gas and $NH_3$ gas and by applying RF power of a frequency higher than 5 MHz, there are many Si—H bonds inside the film; and tensile stress is generated. For example, for a $SiN_x$ film made using $SiH_4$ gas and $NH_3$ gas and by applying RF power of a low frequency of 5 MHz or less, there are many N—H bonds inside the film; and compressive stress is generated.

For example, the concentration of the Si—H bonds included in the first layer 51L is different from the concentration of the Si—H bonds included in the film unit 71. For example, the concentration of the N—H bonds included in the first layer 51L is different from the concentration of the N—H bonds included in the film unit 71.

The first layer 51L may include the material used as the electrode layers. For example, the pressure sensor 320 further includes the first electrode layer 51ae and the second electrode layer 51af. At least a portion of the first magnetic layer 11 and at least a portion of the second magnetic layer 12 are disposed between at least a portion of the first electrode layer 51ae and at least a portion of the second electrode layer 51af. At least a portion of the first layer 51L includes the same material as the material included in at least one of the first electrode layer 51ae or the second electrode layer 51af.

For example, the first sensor unit 51a is provided at a portion on the upper side of the film unit 71; and the electrode layer that accompanies the first sensor unit 51a is provided. In such a case, the stress that remains in the film unit 71 can be reduced by providing a layer (the first layer 51L) of a material similar to that of the electrode layer at a portion on the lower side of the film unit 71.

In the example, the first layer 51L is provided on the lower side of the film unit 71. In other words, a position (a film unit position) along the Z-axis direction of the portion 71pa of the film unit 71 recited above is disposed between a position (a first sensor position) along the Z-axis direction (the direction from the portion 71pa of the film unit 71 recited above toward the first sensor unit 51a) of the first sensor unit 51a and a position (a holder position) along the Z-axis direction of the holder 75. A position (a first position) along the Z-axis direction of the first layer is disposed between the film unit position and the holder position.

In other words, the first layer 51L is provided on the holder 75. A portion (the fixed region 71f) of the film unit 71 is provided on the first layer 51L. One other portion (the deformation region 71d) of the film unit 71 is linked to the fixed region 71f. The first sensor unit 51a is provided on the portion 71pa of the deformation region 71d. The portion 71pa of the film unit 71 is provided between the first sensor unit 51a and a portion of the first layer 51L. The first electrode layer 51ae, the first insulating layer 51ai, and the second electrode layer 51af are provided on the fixed region 71f of the film unit 71.

For example, materials similar to those of these electrode layers are used as the first layer 51L. The stress that remains in the film unit 71 can be small.

In the example as well, the magnetic layers are used in the sensor unit 50. Therefore, higher sensitivity is obtained by providing the sensor unit 50 on the film unit 71 and providing the first layer 51L under the film unit 71. Because the sign (the polarity) of the strain applied to the elements is reversed between the front and back of the film unit 71, a differential voltage from the elements on and under the film unit 71 can be acquired.

Figure 7A:
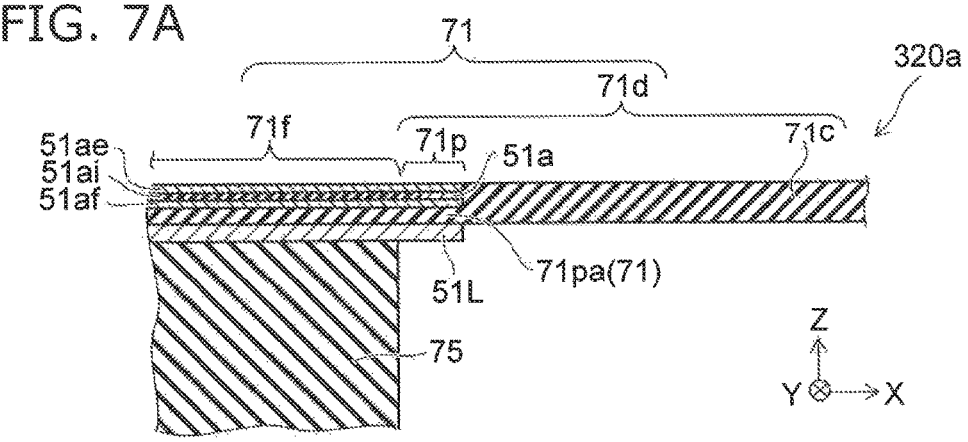
FIG. 7A to FIG. 7C are schematic cross-sectional views illustrating other pressure sensors according to the second embodiment.
Figure 7B:
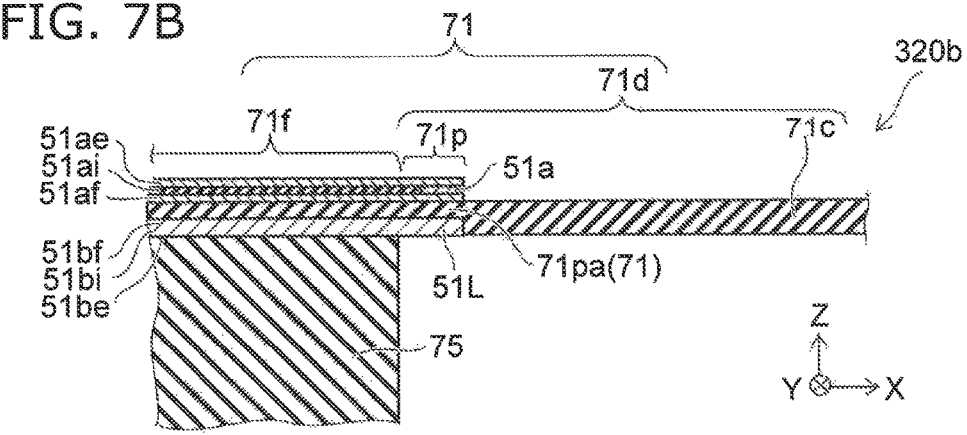
Figure 7C:
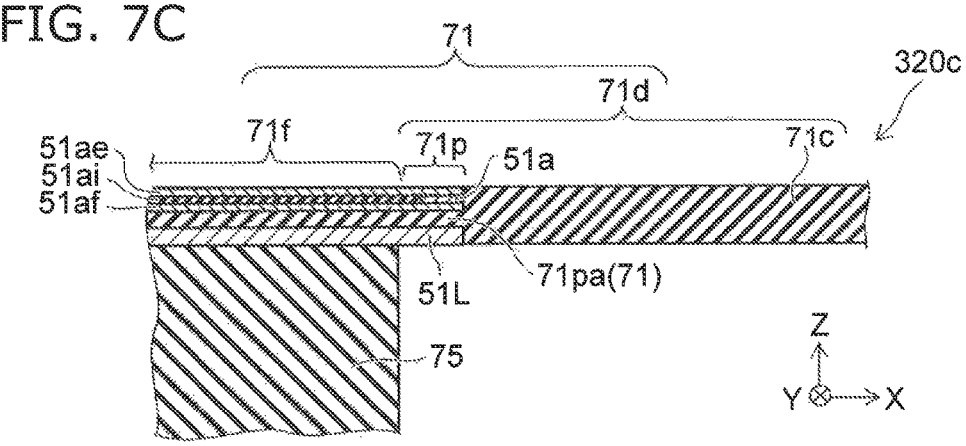

FIG. 7A to FIG. 7C are schematic cross-sectional views illustrating other pressure sensors according to the second embodiment.

In a pressure sensor 320a according to the embodiment as shown in FIG. 7A, the position in the Z-axis direction of the upper surface of the deformation region 71d of the film unit 71 substantially matches the position in the Z-axis direction of the upper surface of the first electrode layer 51ae. The lower surface of the deformation region 71d of the film unit 71 is positioned higher than the lower surface of the first layer 51L. The position in the Z-axis direction of the upper surface of the deformation region 71d of the film unit 71 substantially matches the position in the Z-axis direction of the upper surface of the first layer 51L.

In a pressure sensor 320b according to the embodiment as shown in FIG. 7B, the position in the Z-axis direction of the lower surface of the deformation region 71d of the film unit 71 substantially matches the position in the Z-axis direction of the lower surface of the first layer 51L. The upper surface of the deformation region 71d of the film unit 71 is positioned lower than the upper surface of the second electrode layer 51af. The position in the Z-axis direction of the upper surface of the deformation region 71d of the film unit 71 substantially matches the position in the Z-axis direction of the lower surface of the second electrode layer 51af.

In a pressure sensor 320c according to the embodiment as shown in FIG. 7C, the position in the Z-axis direction of the upper surface of the deformation region 71d of the film unit 71 substantially matches the position in the Z-axis direction of the upper surface of the first electrode layer 51ae. The position in the Z-axis direction of the lower surface of the deformation region 71d of the film unit 71 substantially matches the position in the Z-axis direction of the lower surface of the first layer 51L.

Thus, various modifications are possible for the relationship between the positions in the Z-axis direction of the upper surface and lower surface of the film unit 71 and the positions in the Z-axis direction of the electrode layers. Various modifications are possible for the relationship between the positions in the Z-axis direction of the upper surface and lower surface of the film unit 71 and the position in the Z-axis direction of the first layer 51L.

Figure 8A:
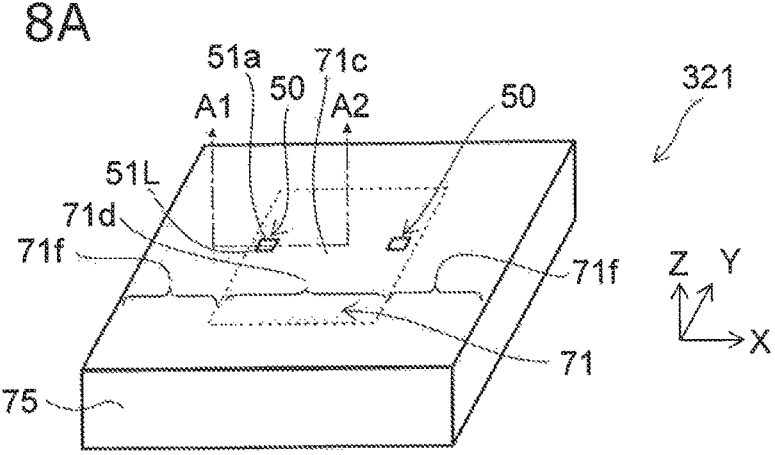
FIG. 8A to FIG. 8C are schematic views illustrating another pressure sensor according to the second embodiment.
Figure 8B:
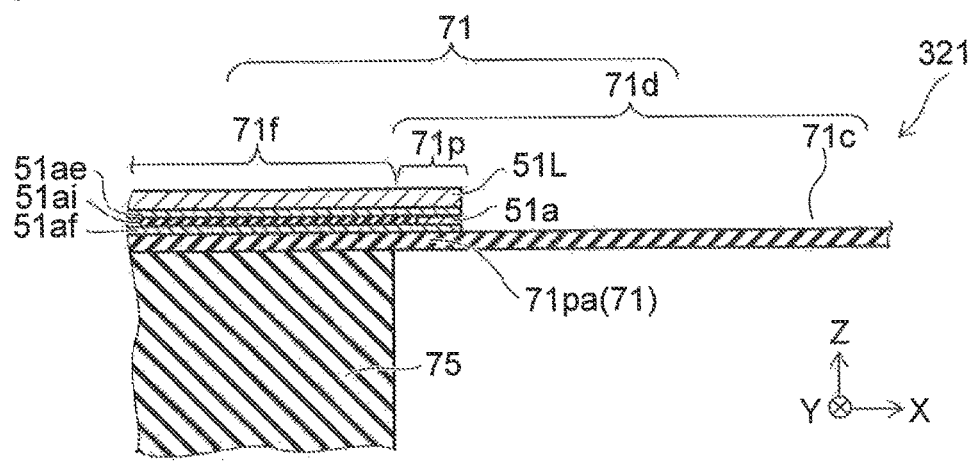
Figure 8C:
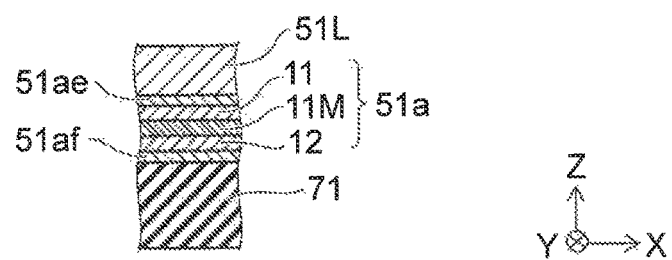
Figure 9A:
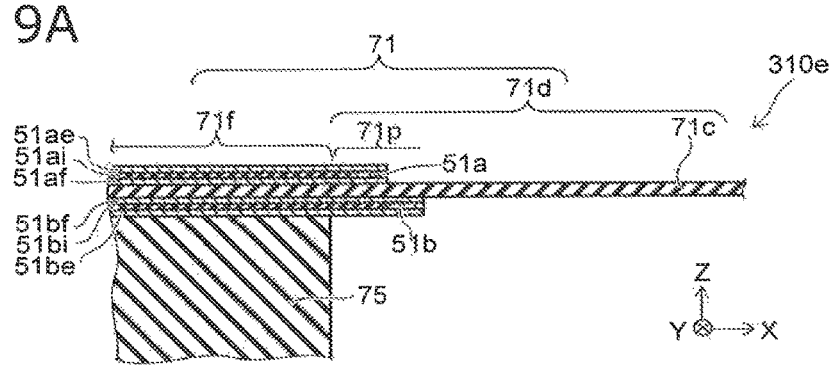
FIG. 9A to FIG. 9D are cross-sectional views illustrating other pressure sensors according to the embodiment.
Figure 9B:
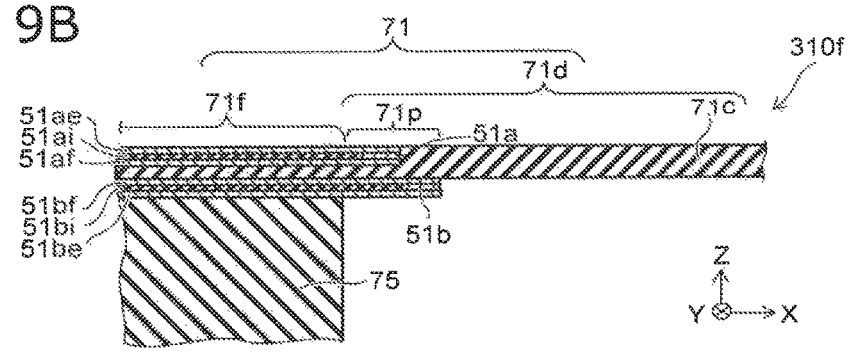
Figure 9C:
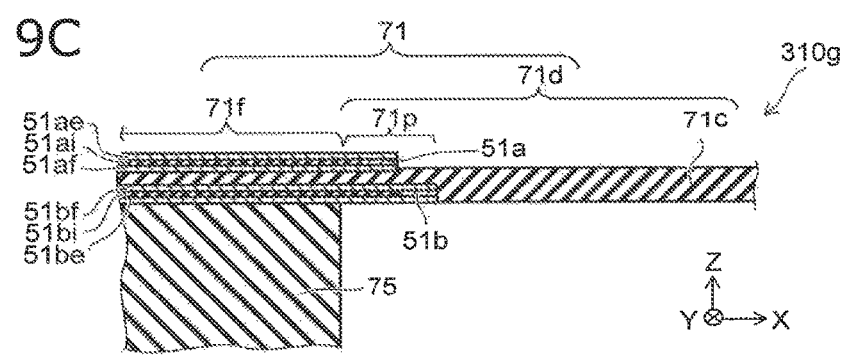
Figure 9D:
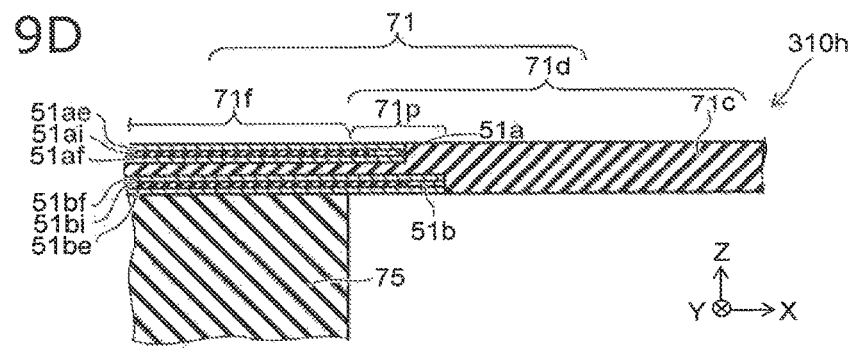
Figure 10A:
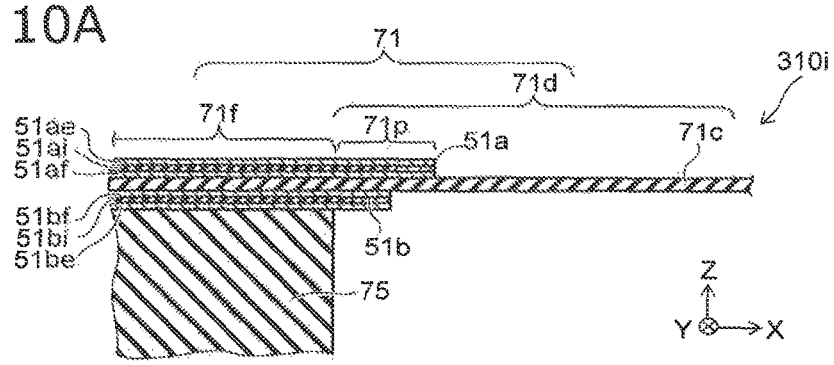
FIG. 10A to FIG. 10D are cross-sectional views illustrating other pressure sensors according to the embodiment.
Figure 10B:
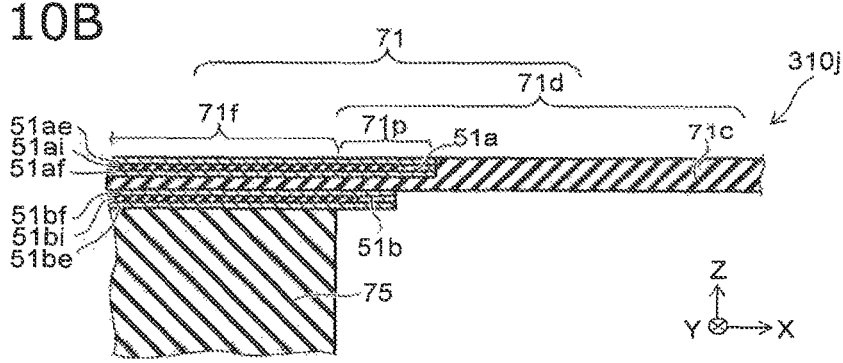
Figure 10C:
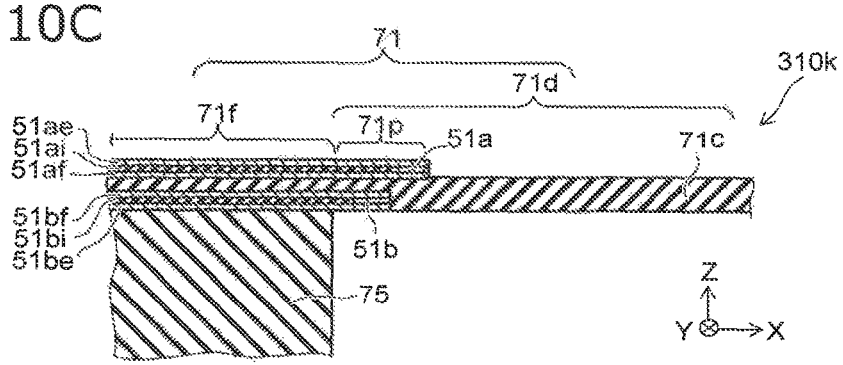
Figure 10D:
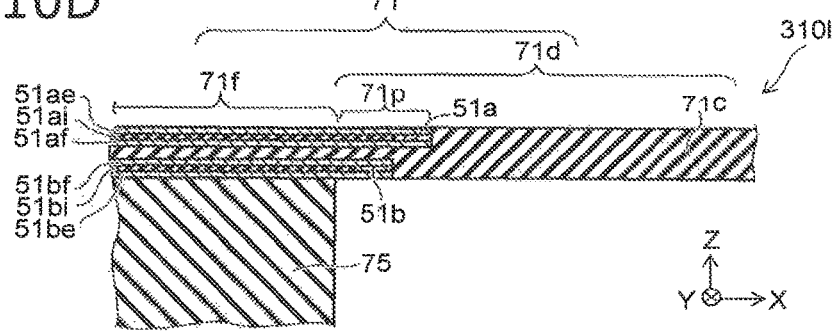
Figure 11A:
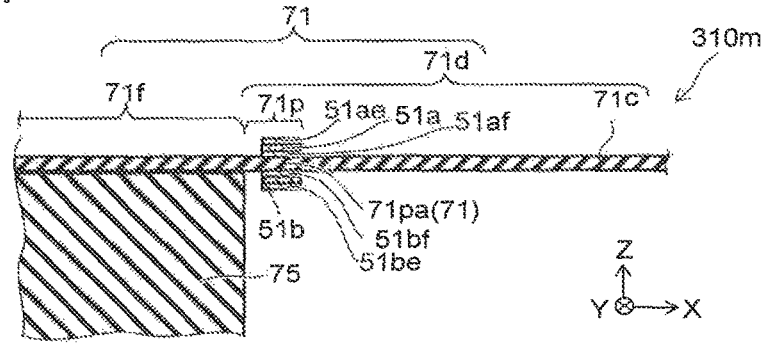
FIG. 11A to FIG. 11D are cross-sectional views illustrating other pressure sensors according to the embodiment.
Figure 11B:
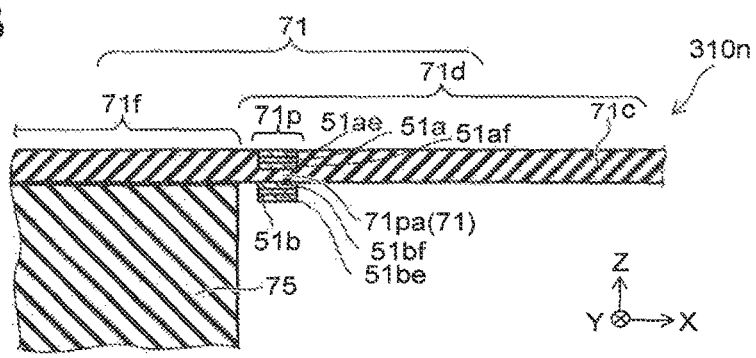
Figure 11C:
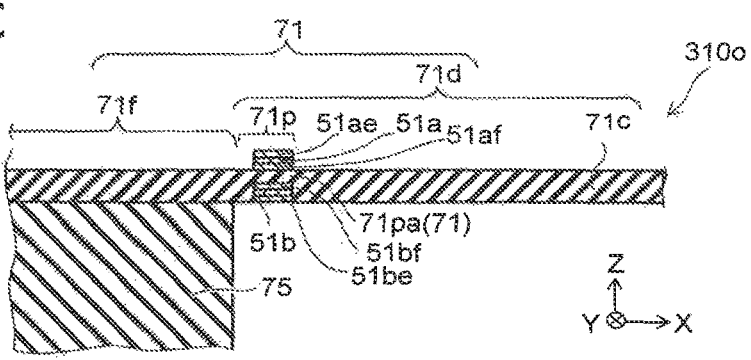
Figure 11D:
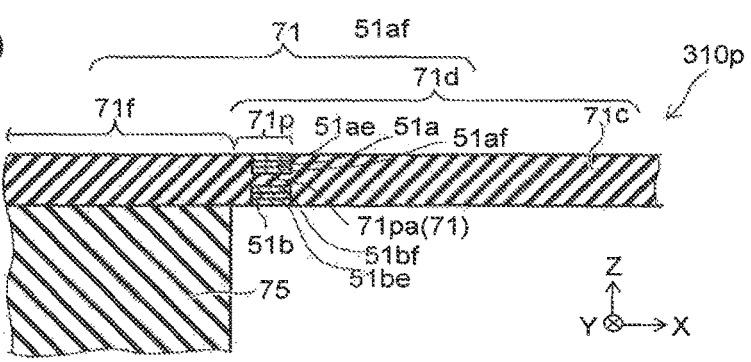
Figure 12A:
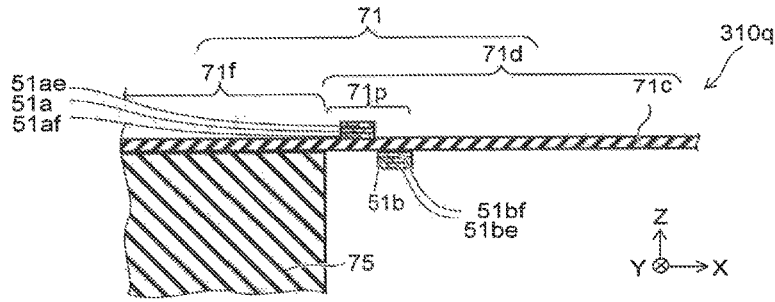
FIG. 12A to FIG. 12D are cross-sectional views illustrating other pressure sensors according to the embodiment.
Figure 12B:
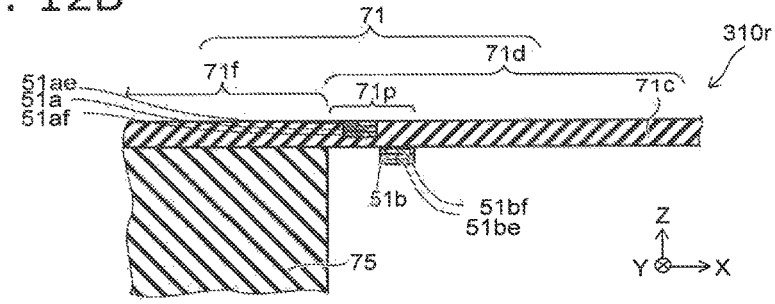
Figure 12C:
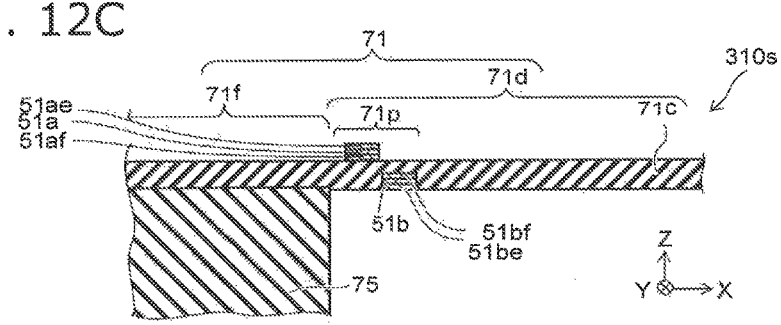
Figure 12D:
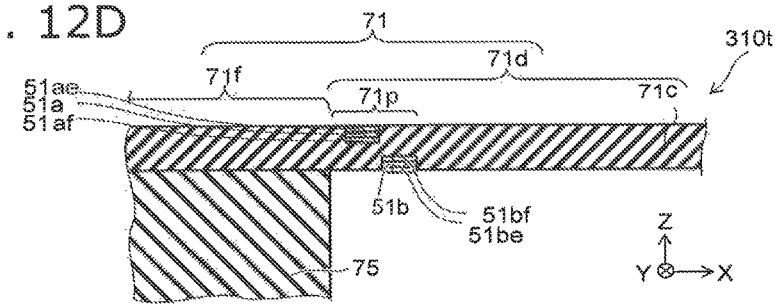
Figure 13A:
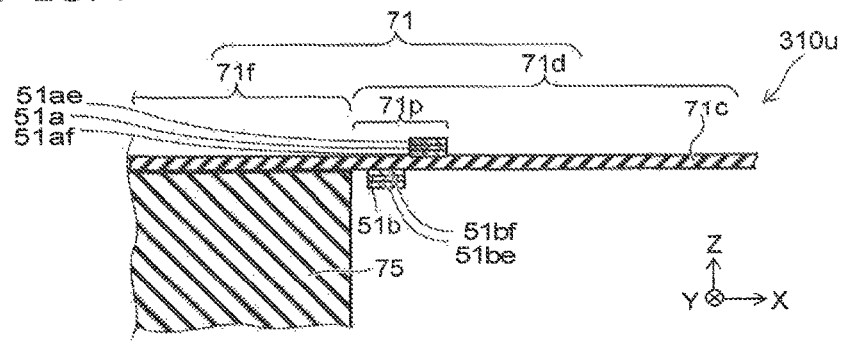
FIG. 13A to FIG. 13D are cross-sectional views illustrating other pressure sensors according to the embodiment.
Figure 13B:
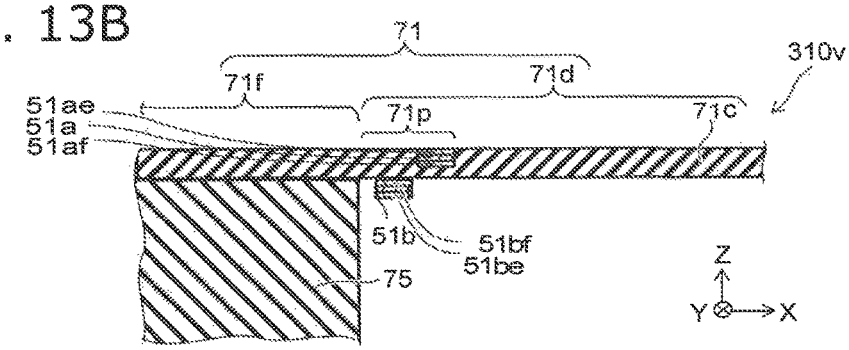
Figure 13C:
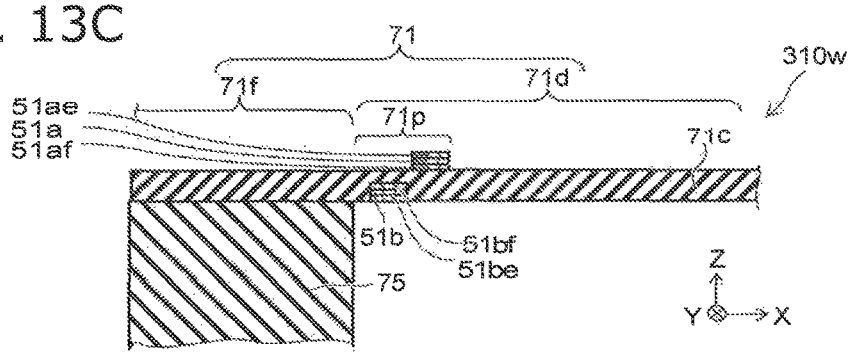
Figure 13D:
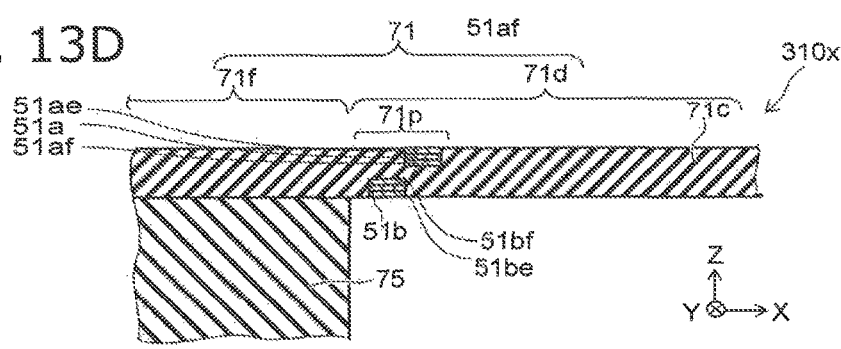
Figure 14A:
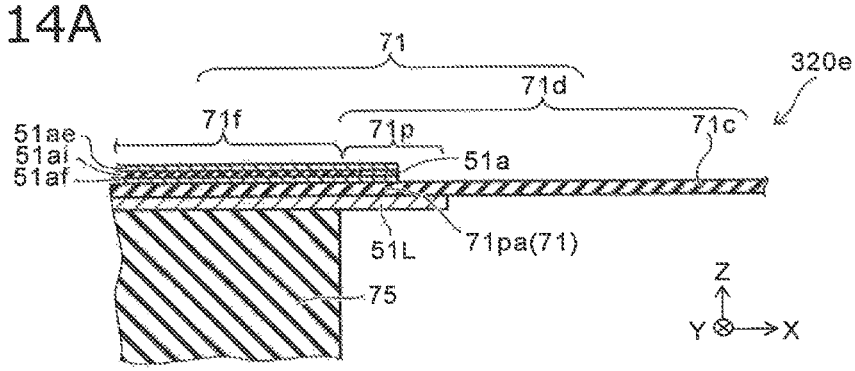
FIG. 14A to FIG. 14D are cross-sectional views illustrating other pressure sensors according to the embodiment.
Figure 14B:
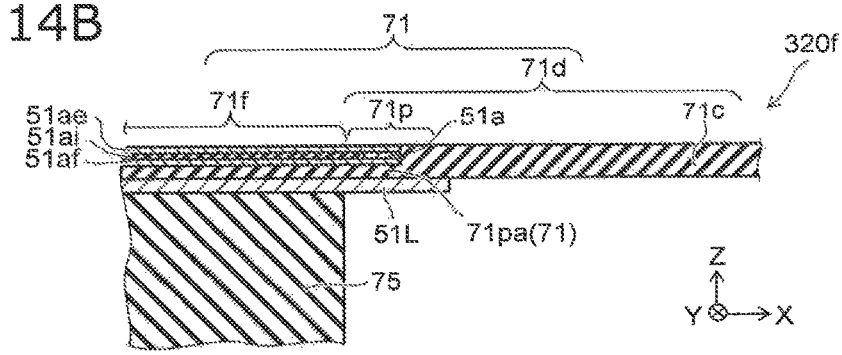
Figure 14C:
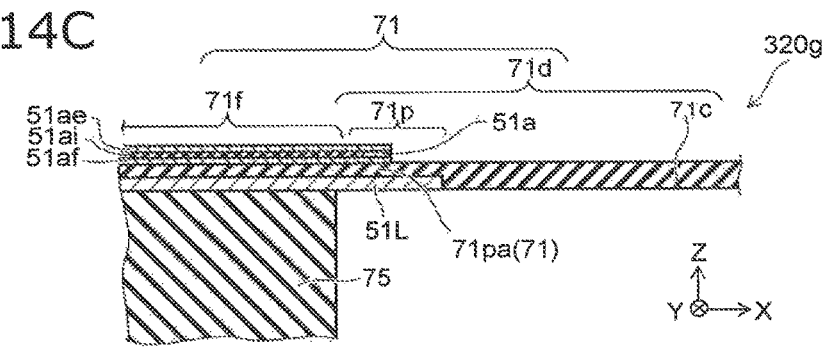
Figure 14D:
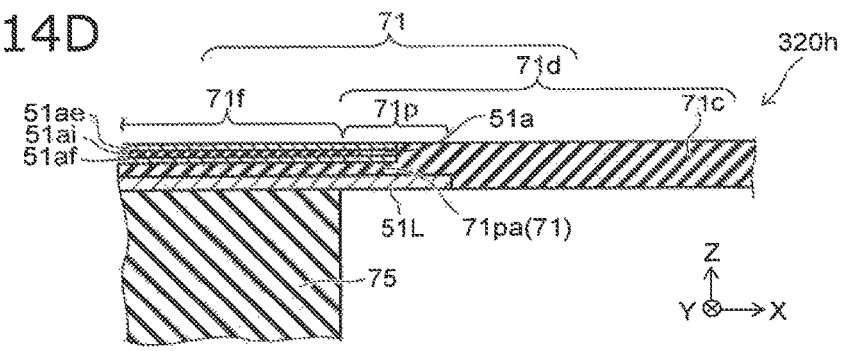
Figure 15A:
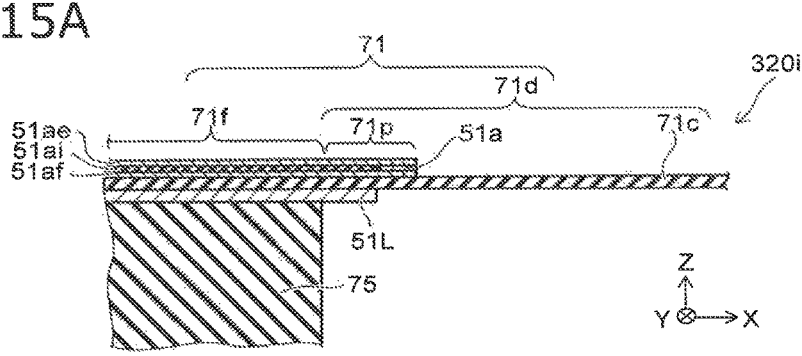
FIG. 15A to FIG. 15D are cross-sectional views illustrating other pressure sensors according to the embodiment.
Figure 15B:
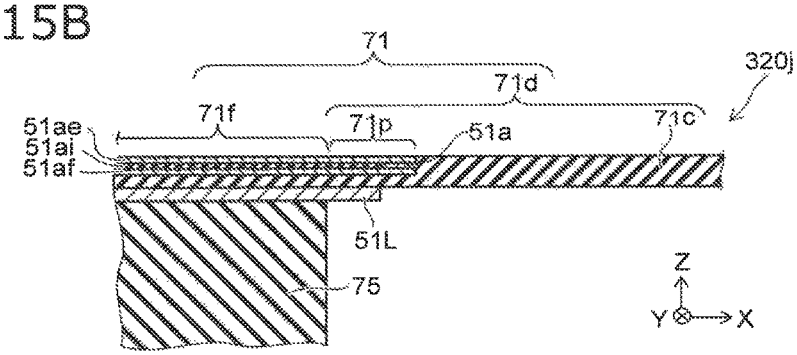
Figure 15C:
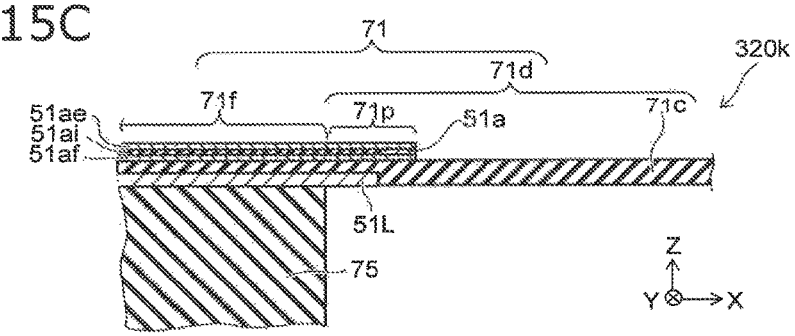
Figure 15D:
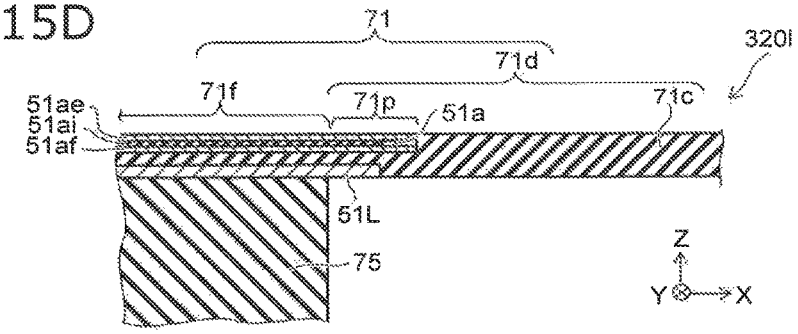

FIG. 8A to FIG. 8C are schematic views illustrating another pressure sensor according to the second embodiment.

FIG. 8A is a perspective view. FIG. 8B is a line A1-A2 cross-sectional view of FIG. 8A. FIG. 8C is a schematic cross-sectional view illustrating a portion of the pressure sensor.

As shown in FIG. 8A and FIG. 8B, the pressure sensor 321 according to the embodiment also includes the first sensor unit 51a, the first layer 51L, the film unit 71, and the holder 75. As shown in FIG. 8C, in such a case as well, the first sensor unit 51a includes the first magnetic layer 11, the second magnetic layer 12, and the first intermediate layer 11M. The first intermediate layer 11M is provided between the first magnetic layer 11 and the second magnetic layer 12.

In the example as shown in FIG. 8B, the first layer 51L is provided on the first sensor unit 51a. In other words, a position (the film unit position) along the Z-axis direction of the portion 71pa of the film unit 71 recited above is disposed between a position (the first layer position) along the Z-axis direction (the direction from the portion 71pa of the film unit 71 recited above toward the first sensor unit 51a) of the first layer 51L and a position (the holder position) along the Z-axis direction of the holder 75. A position (the first sensor position) along the Z-axis direction of the first sensor unit 51a is disposed between the first layer position and the film unit position.

In other words, a portion (the fixed region 71f) of the film unit 71 is provided on the holder 75. One other portion (the deformation region 71d) of the film unit 71 is linked to the fixed region 71f. The first sensor unit 51a is provided on the portion 71pa of the deformation region 71d. The first electrode layer 51ae, the first insulating layer 51ai, and the second electrode layer 51af are provided on the fixed region 71f. The first layer 51L is provided on the first electrode layer 51ae and on the first sensor unit 51a.

In such a case, the first layer 51L may include the same material as the material included in the film unit 71. For example, the film unit 71 is provided under the electrode layer; and the first layer 51L is provided on the electrode layer. The asymmetry of the stress is suppressed by the film unit 71 and the first layer 51L. The stress that remains in the film unit 71 can be reduced by using such a first layer 51L.

In the example as well, magnetic layers are used in the sensor unit 50. Therefore, high sensitivity is obtained by providing the sensor unit 50 on the film unit 71 and providing the first layer 51L on the sensor unit 50. Because the sign (the polarity) of the strain applied to the elements is reversed between the front and back of the film unit 71, a differential voltage from the elements on and under the film unit 71 can be acquired.

For example, the film unit 71 is insulative. The first layer 51L is insulative. The first layer 51L includes, for example, at least one of SiN, $SiO_x$, or $AlO_x$. The film unit 71 includes at least one of SiN, $SiO_x$, or $AlO_x$.

In the second embodiment, the first layer 51L is provided on or under the diaphragm (the film unit 71). The first layer 51L functions as a stress adjusting layer. The optimal range of the strain of the spintronic strain sensor element can be used. Thereby, high sensitivity is obtained.

FIG. 9A to FIG. 12D are cross-sectional views illustrating other pressure sensors according to the embodiment.

In pressure sensors 310e to 310l shown in FIG. 9A to FIG. 10D, the first stacked body 51b does not overlap at least a portion of the first sensor unit 51a in the Z-direction. Otherwise, for example, the pressure sensors 310e to 310l are similar to the pressure sensors 310 and 310a to 310c. In the pressure sensors 310e to 310h, the distance along the X-axis direction between the first sensor unit 51a and the center 71c is longer than the distance along the X-axis direction between the first stacked body 51b and the center 71c. In the pressure sensors 310i to 310l, the distance along the X-axis direction between the first sensor unit 51a and the center 71c is shorter than the distance along the X-axis direction between the first stacked body 51b and the center 71c.

In pressure sensors 310m to 310x shown in FIG. 11A to FIG. 13D, at least a portion of the film unit 71 contacts the holder 75 (the supporter).

FIG. 14A to FIG. 16B are cross-sectional views illustrating other pressure sensors according to the embodiment.

In pressure sensors 320e to 320h as shown in FIG. 14A to FIG. 14D, the distance along the X-axis direction between the first sensor unit 51a and the center 71c is longer than the distance along the X-axis direction between the first layer 51L and the center 71c. In pressure sensors 320i to 320l as shown in FIG. 15A to FIG. 15D, the distance along the X-axis direction between the first sensor unit 51a and the center 71c is shorter than the distance along the X-axis direction between the first layer 51L and the center 71c. Otherwise, for example, the pressure sensors are similar to the pressure sensors 320 and 320a to 320c.

Figure 16A:
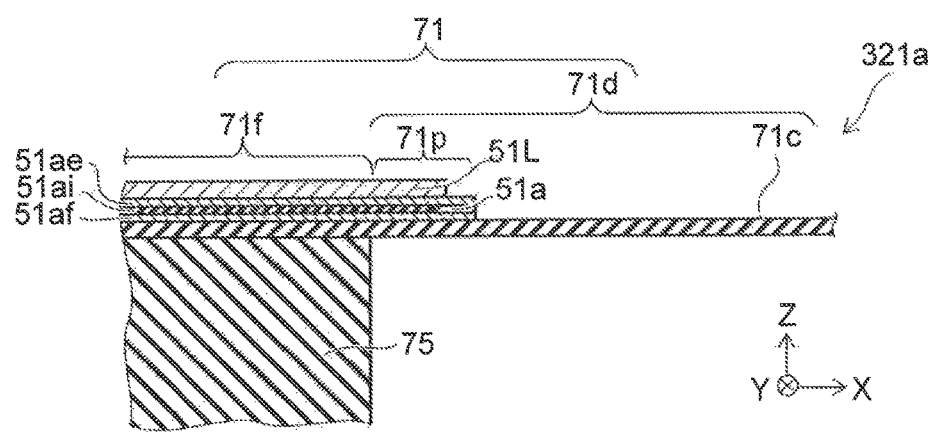
FIG. 16A and FIG. 16B are cross-sectional views illustrating other pressure sensors according to the embodiment.
Figure 16B:
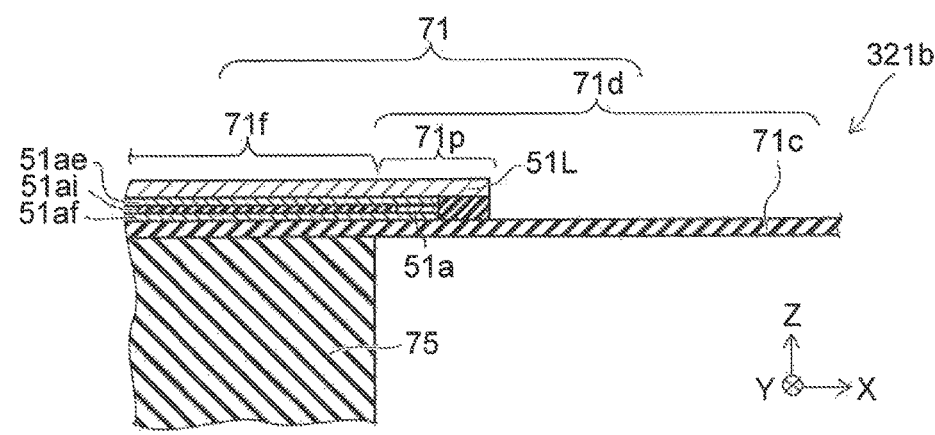
Figure 17A:
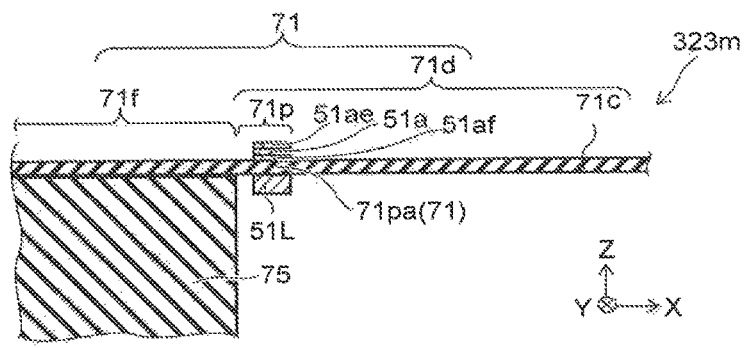
FIG. 17A to FIG. 17D are cross-sectional views illustrating other pressure sensors according to the embodiment.
Figure 17B:
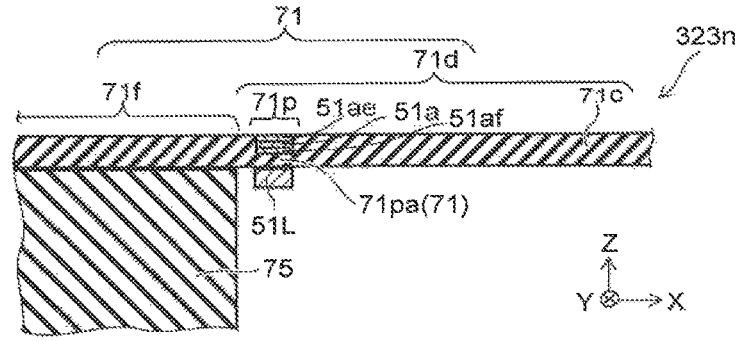
Figure 17C:
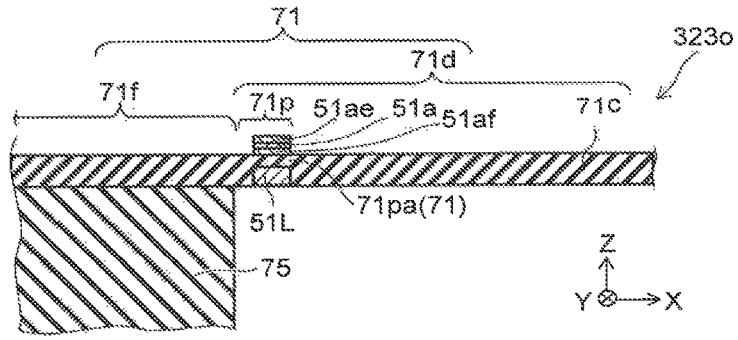
Figure 17D:
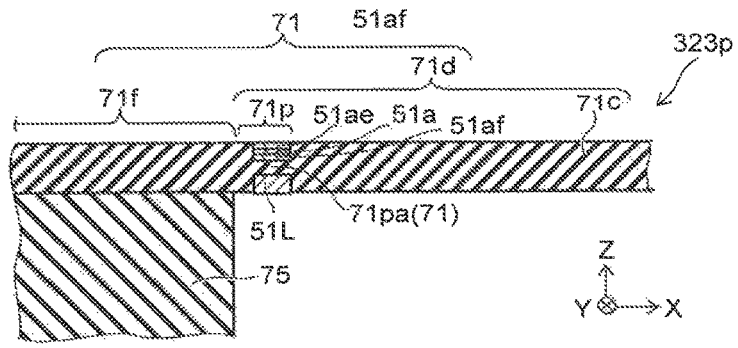
Figure 18A:
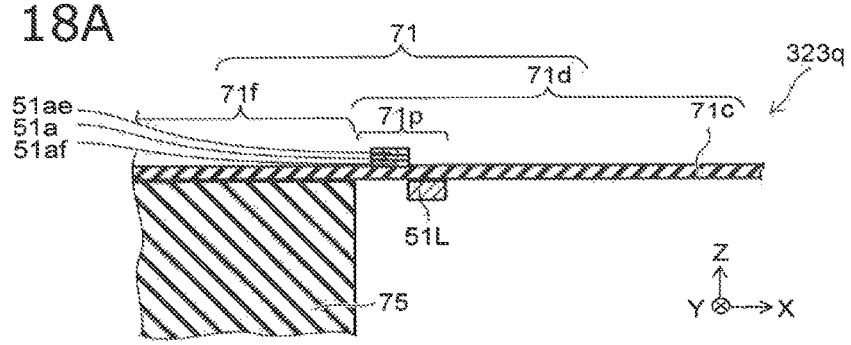
FIG. 18A to FIG. 18D are cross-sectional views illustrating other pressure sensors according to the embodiment.
Figure 18B:
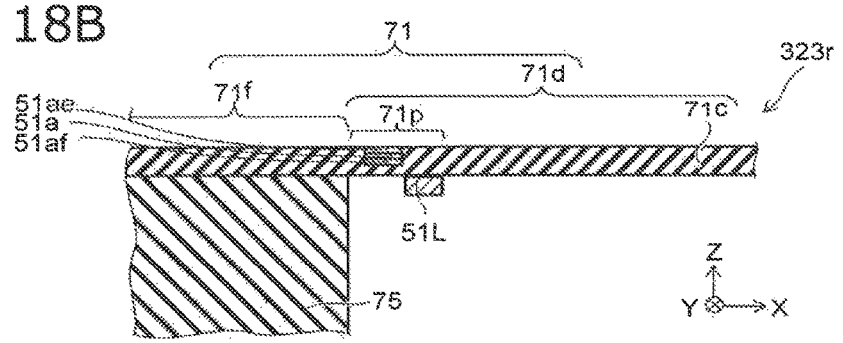
Figure 18C:
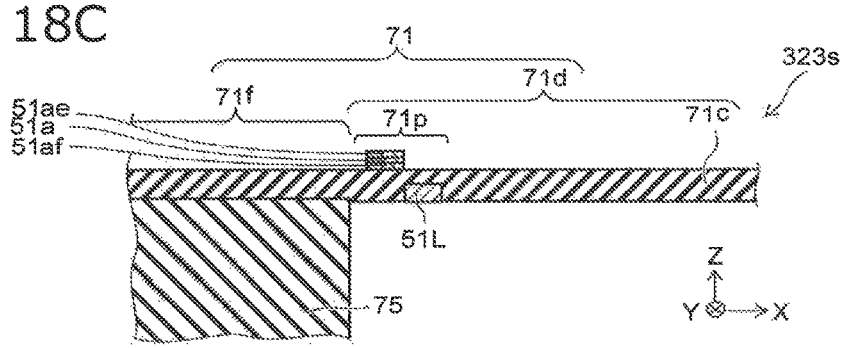
Figure 18D:
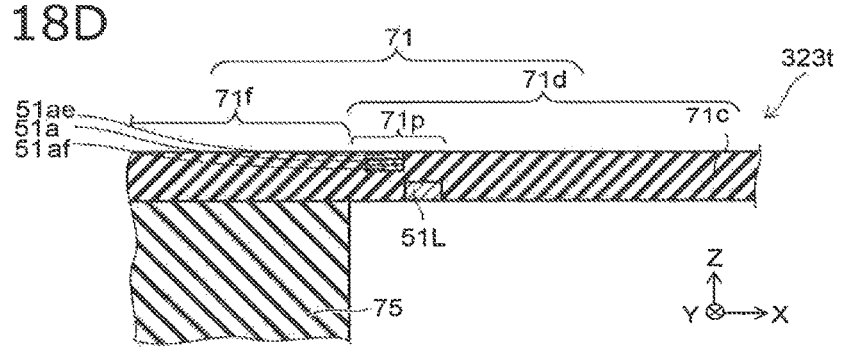
Figure 19A:
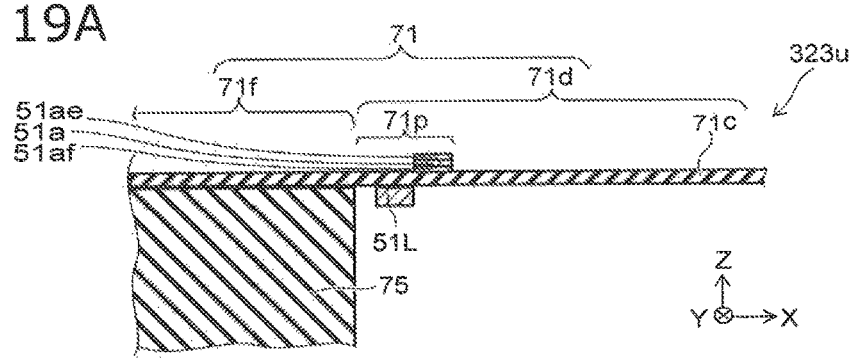
FIG. 19A to FIG. 19D are cross-sectional views illustrating other pressure sensors according to the embodiment.
Figure 19B:
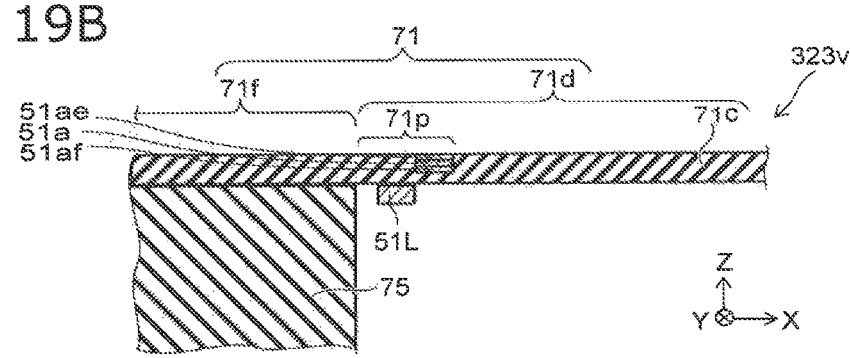
Figure 19C:
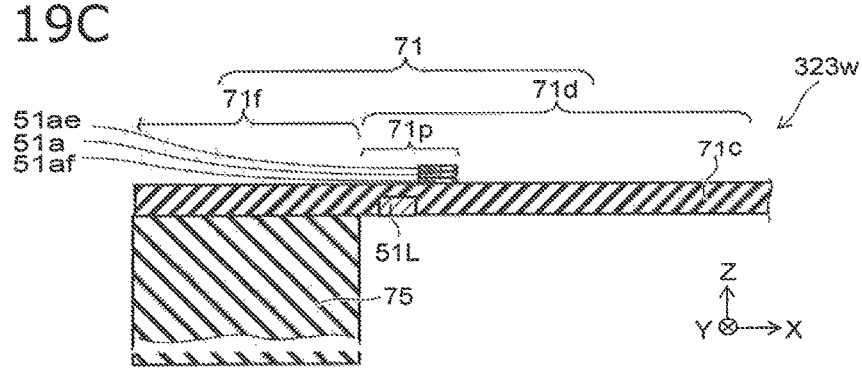
Figure 19D:
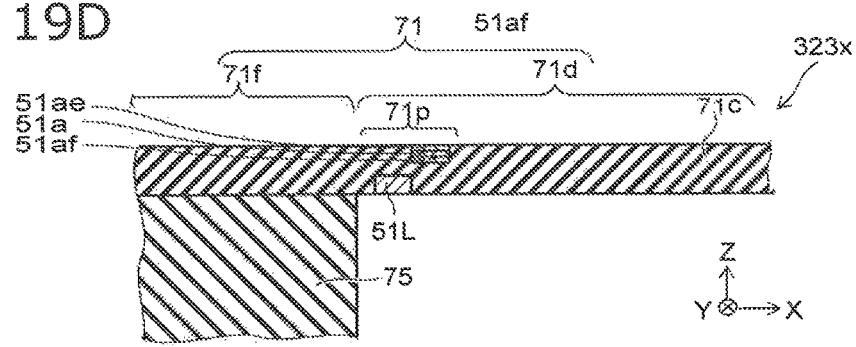
Figure 20A:
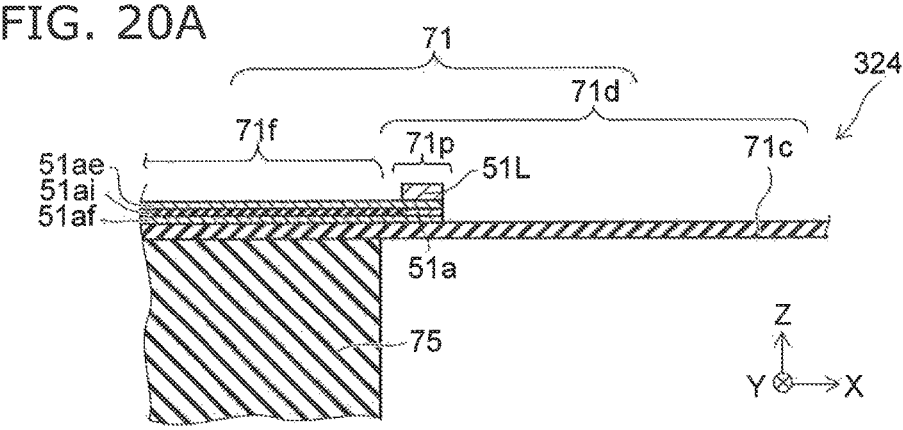
FIG. 20A to FIG. 20C are cross-sectional views illustrating other pressure sensors according to the embodiment.
Figure 20B:
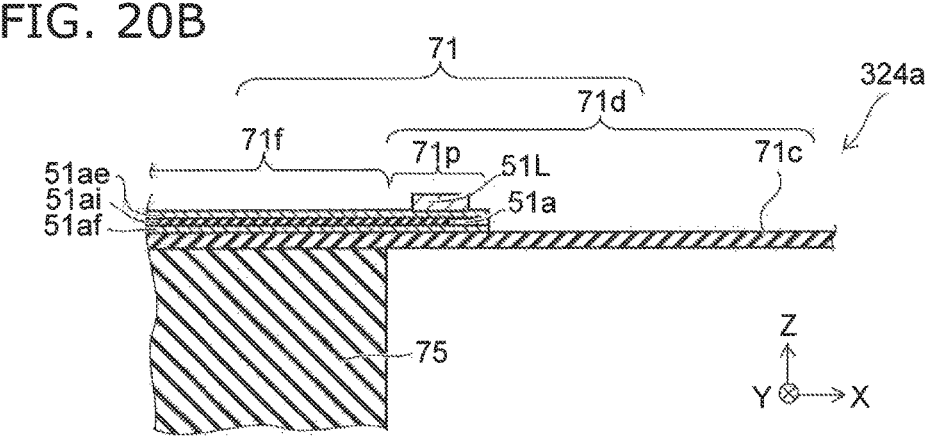
Figure 20C:
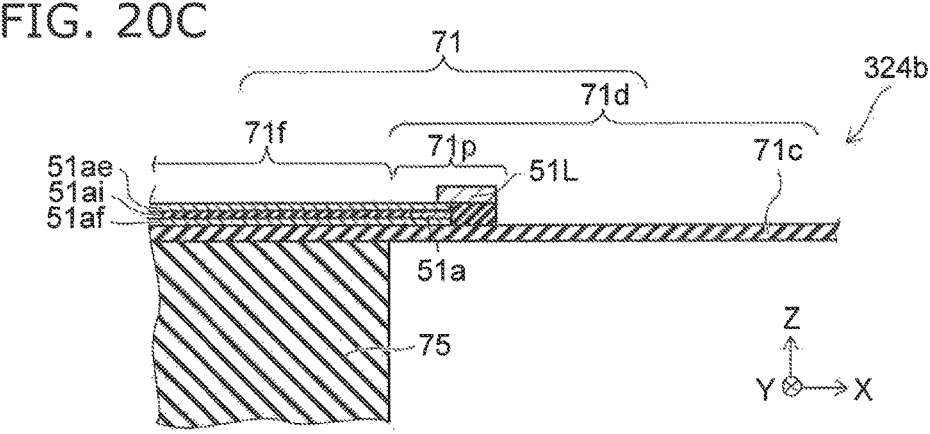

In pressure sensors 321a and 321b as shown in FIG. 16A and FIG. 16B, the first layer 51L is provided on the first sensor unit 51a. In these pressure sensors, the distance along the X-axis direction between the first sensor unit 51a and the center 71c is different from the distance along the X-axis direction between the first layer 51L and the center 71c. Otherwise, for example, the pressure sensors 321a and 321b are similar to the pressure sensor 321.

FIG. 17A to FIG. 20C are cross-sectional views illustrating other pressure sensors according to the embodiment.

In pressure sensors 323m to 323x as shown in FIG. 17A to FIG. 20C, at least a portion of the film unit 71 contacts the holder 75 (the supporter). In the pressure sensors 323m to 323x, the first layer 51L is provided on the lower side of the film unit 71 of the peripheral region 71p. In pressure sensors 324, 324a, and 324b, the first layer 51L is provided on the upper side of the first sensor unit 51a.

Third Embodiment

The embodiment relates to an electronic device. The electronic device includes, for example, the pressure sensor (the sensor) or a modification of the pressure sensor (the sensor) according to the first or second embodiment. The electronic device includes, for example, an information terminal. The information terminal includes an IC recorder, etc. The electronic device includes a microphone, a blood pressure sensor, a touch panel, etc.

Figure 21:
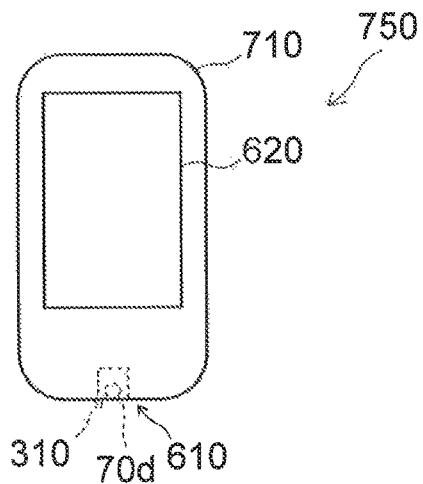
FIG. 21 is a schematic view illustrating an electronic device according to a third embodiment.

FIG. 21 is a schematic view illustrating the electronic device according to the third embodiment.

As shown in FIG. 21, the electronic device 750 according to the embodiment is, for example, the information terminal 710. For example, the microphone 610 is provided in the information terminal 710.

The microphone 610 includes, for example, the pressure sensor 310. For example, a film unit 70d is substantially parallel to the surface of the information terminal 710 where a display unit 620 is provided. The disposition of the film unit 70d is arbitrary.

Figure 22A:
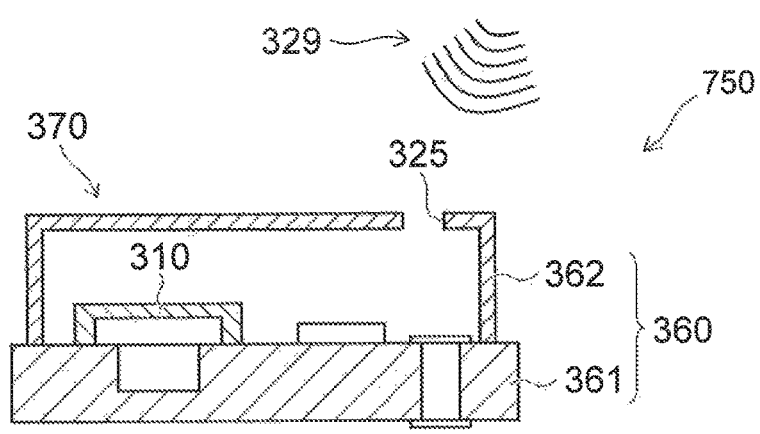
FIG. 22A and FIG. 22B are schematic cross-sectional views illustrating the electronic device according to the third embodiment.
Figure 22B:
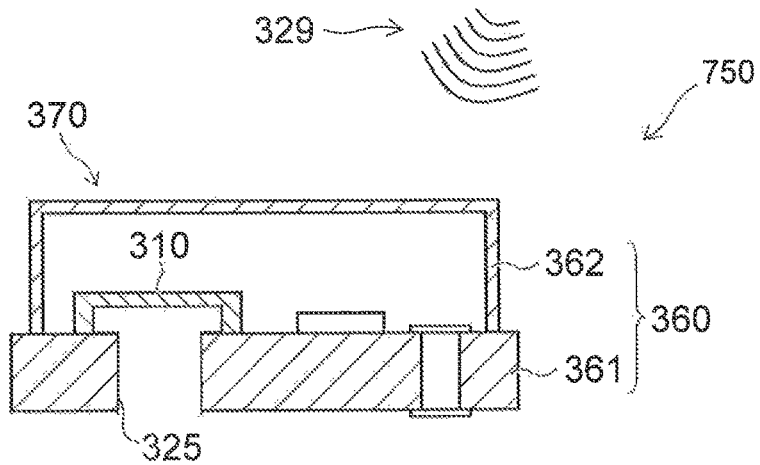

FIG. 22A and FIG. 22B are schematic cross-sectional views illustrating the electronic device according to the third embodiment.

As shown in FIG. 22A and FIG. 22B, the electronic device 750 (e.g., the microphone 370 (the acoustic microphone)) includes a housing 360, a cover 362, and the pressure sensor 310. The housing 360 includes, for example, a substrate 361 (e.g., a printed circuit board) and a cover 362. The substrate 361 includes, for example, a circuit such as an amplifier, etc. An acoustic hole 325 is provided in the housing 360 (at least one of the substrate 361 or the cover 362). Sound 329 passes through the acoustic hole 325 and enters the interior of the cover 362. The microphone 370 is sensitive to the sound pressure. For example, the pressure sensor 310 is mounted on the substrate 361; and electrical signal lines are provided. The cover 362 is provided on the substrate 361 to cover the pressure sensor 310. Thus, the housing 360 is provided around the sensor 310. For example, the first sensor unit 51a and the film unit 71 are disposed between the substrate 361 and the cover 362. For example, the sensor 310 is disposed between the substrate 361 and the cover 362.

FIG. 23A and FIG. 23B are schematic views illustrating another electronic device according to the third embodiment.

In the example of these drawings, the electronic device 750 is a blood pressure sensor 330. FIG. 23A is a schematic plan view illustrating skin on an arterial vessel of a human. FIG. 23B is a line H1-H2 cross-sectional view of FIG. 23A.

The pressure sensor 310 is used as a pressure sensor in the blood pressure sensor 330. The pressure sensor 310 is pressed onto the skin 333 on the arterial vessel 331. Thereby, the blood pressure sensor 330 can continuously perform blood pressure measurements.

FIG. 24 is a schematic view illustrating another electronic device according to the third embodiment.

In the example of the drawing, the electronic device 750 is a touch panel 340. In the touch panel 340, the pressure sensors 310 are mounted to at least one of the interior of the display or the exterior of the display.

For example, the touch panel 340 includes multiple first interconnects 346, multiple second interconnects 347, the multiple pressure sensors 310, and a controller 341.

In the example, the multiple first interconnects 346 are arranged along the Y-axis direction. Each of the multiple first interconnects 346 extends along the X-axis direction. The multiple second interconnects 347 are arranged along the X-axis direction. Each of the multiple second interconnects 347 extends along the Y-axis direction.

The multiple pressure sensors 310 are provided respectively at the intersections between the multiple first interconnects 346 and the multiple second interconnects 347. One pressure sensor 310 is used as one sensing element Es for sensing. Here, the intersection includes the position where the first interconnect 346 and the second interconnect 347 intersect and includes the region at the periphery of the position.

One end E1 of each of the multiple pressure sensors 310 is connected respectively to the multiple first interconnects 346. One other end E2 of each of the multiple pressure sensors 310 is connected respectively to the multiple second interconnects 347.

The controller 341 is connected to the multiple first interconnects 346 and the multiple second interconnects 347. For example, the controller 341 includes a first interconnect circuit 346d that is connected to the multiple first interconnects 346, a second interconnect circuit 347d that is connected to the multiple second interconnects 347, and a control circuit 345 that is connected to the first interconnect circuit 346d and the second interconnect circuit 347d.

According to the third embodiment, an electronic device that uses a sensor in which the sensitivity can be increased can be provided.

The embodiments include, for example, the following configurations.

(Configuration 1)

A sensor, comprising:

a first sensor unit, the first sensor unit including a first magnetic layer, a second magnetic layer, and a first intermediate layer, the first intermediate layer being provided between the first magnetic layer and the second magnetic layer;

a first stacked body, the first stacked body including a third magnetic layer, a fourth magnetic layer, and a second intermediate layer, the second intermediate layer being provided between the third magnetic layer and the fourth magnetic layer; and a film unit, the film unit being deformable, a portion of the film unit being disposed between the first sensor unit and the first stacked body.

(Configuration 2)

The sensor according to configuration 1, wherein an electrical resistance between the first magnetic layer and the second magnetic layer changes according to the deformation of the film unit.

(Configuration 3)

The sensor according to configuration 1 or 2, wherein an electrical resistance between the third magnetic layer and the fourth magnetic layer changes according to the deformation of the film unit.

(Configuration 4)

The sensor according to one of configurations 1 to 3, further comprising: a supporter supporting the film unit.

(Configuration 5)

The sensor according to one of configurations 1 to 3, further comprising:

a supporter;

a first electrode layer; and a second electrode layer, the first magnetic layer and the second magnetic layer being disposed between a portion of the first electrode layer and a portion of the second electrode layer, the film unit including a fixed region and a deformation region, the fixed region being fixed to the supporter, the deformation region deforming, a portion of at least one of the first electrode layer or the second electrode layer overlapping the fixed region in a second direction, the second direction intersecting a first direction, the first direction being from the fixed region toward the deformation region.

(Configuration 6)

The sensor according to configuration 5, wherein the deformation region includes a center of the deformation region, and a peripheral region provided around the center, the portion of the film unit is positioned in the peripheral region, and a distance between the peripheral region and the fixed region is shorter than a distance between the peripheral region and the center.

(Configuration 7)

The sensor according to one of configurations 1 to 3, further comprising:

a supporter;

a third electrode layer; and a fourth electrode layer, the third magnetic layer and the fourth magnetic layer being disposed between a portion of the third electrode layer and a portion of the fourth electrode layer, the film unit including a fixed region and a deformation region, the fixed region being fixed to the supporter, the deformation region deforming, a portion of at least one of the third electrode layer or the fourth electrode layer overlapping the fixed region in a second direction, the second direction intersecting a first direction, the first direction being from the fixed region toward the deformation region.

(Configuration 8)

The sensor according to configuration 7, wherein the deformation region includes a center of the deformation region, and a peripheral region provided around the center, the portion of the film unit is positioned in the peripheral region, and a distance between the peripheral region and the fixed region is shorter than a distance between the peripheral region and the center.

(Configuration 9)

The sensor according to configuration 7 or configuration 8, wherein the portion of at least one of the third electrode layer or the fourth electrode layer is disposed between the supporter and the fixed region (Configuration 10)

The sensor according to one of configurations 1 to 9, wherein one of at least a first magnetization of the first magnetic layer or a second magnetization of the second magnetic layer changes according to the deformation of the film unit.

(Configuration 11)

The sensor according to one of configurations 1 to 10, further comprising:

a second sensor unit, the second sensor unit including a fifth magnetic layer, a sixth magnetic layer, and a third intermediate layer, the third intermediate layer being provided between the fifth magnetic layer and the sixth magnetic layer; and a second stacked body, the second stacked body including a seventh magnetic layer, an eighth magnetic layer, and a fourth intermediate layer, the fourth intermediate layer being provided between the seventh magnetic layer and the eighth magnetic layer, one other portion of the film unit being disposed between the second sensor unit and the second stacked body.

(Configuration 12)

The sensor according to configuration 11, wherein the second sensor unit is electrically connected in series to the first sensor unit.

(Configuration 13)

A sensor, comprising:

a first sensor unit, the first sensor unit including a first magnetic layer, a second magnetic layer, and a first intermediate layer, the first intermediate layer being provided between the first magnetic layer and the second magnetic layer;

a first layer; and a film unit, the film unit being deformable, a portion of the film unit being disposed between the first sensor unit and the first layer, a material of the first layer being different from a material of the film unit.

(Configuration 14)

The sensor according to configuration 13, wherein one other portion of the film unit does not overlap the first layer in a direction being from the portion of the film unit toward the first sensor unit.

(Configuration 15)

The sensor according to configuration 13 or configuration 14, wherein a residual stress of the first layer is different from a residual stress of the film unit.

(Configuration 16)

The sensor according to one of configurations 13 to 15, further comprising: a supporter supporting the film unit.

(Configuration 17)

The sensor according to configuration 16, wherein a film unit position along a direction from the portion toward the first sensor unit is disposed between a first sensor position along the direction of the first sensor unit and a supporter position along the direction of the supporter, and a first position along the direction of the first layer is disposed between the film unit position and the supporter position.

(Configuration 18)

The sensor according to configuration 17, further comprising:

a first electrode layer; and a second electrode layer, at least a portion of the first magnetic layer and at least one of the second magnetic layer being disposed between at least one of the first electrode layer and at least one of the second electrode layer, and at least one of the first layer including a same material as a material included in at least one the first electrode layer or the second electrode layer.

(Configuration 19)

The sensor according to configuration 16, further comprising a supporter supporting the film unit, a film unit position along a direction from the portion toward the first sensor unit being disposed between a first layer position along the direction of the first layer and a supporter position along the direction of the supporter, and a first sensor position along the direction of the first sensor unit being disposed between the first layer position and the film unit position.

(Configuration 20)

The sensor according to configuration 19, wherein the first layer is insulative.

(Configuration 21)

The sensor according to one of configurations 1 to 20, wherein the first magnetic layer includes one or more selected from a group consisting of Fe, Co and Ni, the second magnetic layer includes one or more selected from a group consisting of Fe, Co and Ni, the first intermediate layer includes one or more selected a group consisting of Cu, Au, Ag, a magnesium oxide, aluminum oxide, titanium oxide and a zinc oxide.

(Configuration 22)

The sensor according to one of configurations 1 to 21, further comprising:

a substrate; and a cover, the first sensor unit and the film unit being disposed between the substrate and the cover.

(Configuration 23)

An electronic device further comprising:

a housing provided around the sensor according to configurations 1 to 21.

In this specification, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as sensor units, stacked bodies, electrodes, film units, and holders, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors and electronic devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a first sensor unit, the first sensor unit including a first magnetic layer, a second magnetic layer, and a first intermediate layer, the first intermediate layer being provided between the first magnetic layer and the second magnetic layer;
   a first stacked body, the first stacked body including a third magnetic layer, a fourth magnetic layer, and a second intermediate layer, the second intermediate layer being provided between the third magnetic layer and the fourth magnetic layer; and
   a film unit, the film unit being deformable, a portion of the film unit being disposed between the first sensor unit and the first stacked body.

2. The sensor according to claim 1, wherein an electrical resistance between the first magnetic layer and the second magnetic layer changes according to the deformation of the film unit.

3. The sensor according to claim 1, wherein an electrical resistance between the third magnetic layer and the fourth magnetic layer changes according to the deformation of the film unit.

4. The sensor according to claim 1, further comprising: a supporter supporting the film unit.

5. The sensor according to claim 1, further comprising:
   a supporter;
   a first electrode layer; and
   a second electrode layer,
   the first magnetic layer and the second magnetic layer being disposed between a portion of the first electrode layer and a portion of the second electrode layer,
   the film unit including a fixed region and a deformation region, the fixed region being fixed to the supporter, the deformation region deforming,
   a portion of at least one of the first electrode layer or the second electrode layer overlapping the fixed region in a second direction, the second direction intersecting a first direction, the first direction being from the fixed region toward the deformation region.

6. The sensor according to claim 5, wherein
   the deformation region includes a center of the deformation region, and a peripheral region provided around the center,
   the portion of the film unit is positioned in the peripheral region, and
   a distance between the peripheral region and the fixed region is shorter than a distance between the peripheral region and the center.

7. The sensor according to claim 1, further comprising:
   a supporter;
   a third electrode layer; and
   a fourth electrode layer,
   the third magnetic layer and the fourth magnetic layer being disposed between a portion of the third electrode layer and a portion of the fourth electrode layer,
   the film unit including a fixed region and a deformation region, the fixed region being fixed to the supporter, the deformation region deforming,
   a portion of at least one of the third electrode layer or the fourth electrode layer overlapping the fixed region in a second direction, the second direction intersecting a first direction, the first direction being from the fixed region toward the deformation region.

8. The sensor according to claim 7, wherein
   the deformation region includes a center of the deformation region, and a peripheral region provided around the center,
   the portion of the film unit is positioned in the peripheral region, and
   a distance between the peripheral region and the fixed region is shorter than a distance between the peripheral region and the center.

9. The sensor according to claim 7, wherein the portion of at least one of the third electrode layer or the fourth electrode layer is disposed between the supporter and the fixed region.

10. The sensor according to claim 1, wherein one of at least a first magnetization of the first magnetic layer or a second magnetization of the second magnetic layer changes according to the deformation of the film unit.

11. The sensor according to claim 1, further comprising:
    a second sensor unit, the second sensor unit including a fifth magnetic layer, a sixth magnetic layer, and a third intermediate layer, the third intermediate layer being provided between the fifth magnetic layer and the sixth magnetic layer; and
    a second stacked body, the second stacked body including a seventh magnetic layer, an eighth magnetic layer, and a fourth intermediate layer, the fourth intermediate layer being provided between the seventh magnetic layer and the eighth magnetic layer, one other portion of the film unit being disposed between the second sensor unit and the second stacked body.

12. The sensor according to claim 11, wherein the second sensor unit is electrically connected in series to the first sensor unit.

13. A sensor, comprising:
a first sensor unit, the first sensor unit including a first magnetic layer, a second magnetic layer, and a first intermediate layer, the first intermediate layer being provided between the first magnetic layer and the second magnetic layer;
a first layer; and
a film unit, the film unit being deformable, a portion of the film unit being disposed between the first sensor unit and the first layer,
wherein:
   a material of the first layer is different from a material of the film unit; and
   one other portion of the film unit does not overlap the first layer in a direction being from the portion of the film unit toward the first sensor unit.

14. The sensor according to claim 13, further comprising: a supporter supporting the film unit.

15. A sensor, comprising:
a first sensor unit, the first sensor unit including a first magnetic layer, a second magnetic layer, and a first intermediate layer, the first intermediate layer being provided between the first magnetic layer and the second magnetic layer;
a first layer;
a film unit, the film unit being deformable, a portion of the film unit being disposed between the first sensor unit and the first layer,
a material of the first layer being different from a material of the film unit; and
a supporter supporting the film unit;
wherein:
   a film unit position along a direction from the portion toward the first sensor unit is disposed between a first sensor position along the direction of the first sensor unit and a supporter position along the direction of the supporter, and
   a first position along the direction of the first layer is disposed between the film unit position and the supporter position.

16. The sensor according to claim 15, further comprising:
a first electrode layer; and
a second electrode layer,
at least a portion of the first magnetic layer and at least one of the second magnetic layer being disposed between at least one of the first electrode layer and at least one of the second electrode layer, and
at least one of the first layer including a same material as a material included in at least one the first electrode layer or the second electrode layer.

17. The sensor according to claim 16, further comprising a supporter supporting the film unit,
a film unit position along a direction from the portion toward the first sensor unit being disposed between a first layer position along the direction of the first layer and a supporter position along the direction of the supporter, and
a first sensor position along the direction of the first sensor unit being disposed between the first layer position and the film unit position.

18. The sensor according to claim 1, further comprising:
a substrate; and
a cover,
the first sensor unit and the film unit being disposed between the substrate and the cover.

19. An electronic device further comprising:
a housing provided around the sensor according to claim 1.

\* \* \* \* \*